US012710150B2

(12) United States Patent
Jung et al.

(10) Patent No.: US 12,710,150 B2
(45) Date of Patent: Aug. 18, 2026

(54) VEHICLE LAMP

(71) Applicant: SL Corporation, Daegu (KR)

(72) Inventors: Jin Young Jung, Gyeongsan-si (KR); Jun Tae Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/933,851

(22) Filed: Oct. 31, 2024

(65) Prior Publication Data

US 2025/0164092 A1 May 22, 2025

(30) Foreign Application Priority Data

Nov. 22, 2023 (KR) ........................ 10-2023-0163476

(51) Int. Cl.

| | |
|---|---|
| ***F21S 41/00*** | (2018.01) |
| ***F21S 41/24*** | (2018.01) |
| ***F21S 41/265*** | (2018.01) |
| ***F21S 41/36*** | (2018.01) |
| ***F21S 41/37*** | (2018.01) |
| *F21Y 115/10* | (2016.01) |

(52) U.S. Cl.

CPC ............ *F21S 41/24* (2018.01); *F21S 41/265* (2018.01); *F21S 41/36* (2018.01); *F21S 41/37* (2018.01); *F21Y 2115/10* (2016.08)

(58) Field of Classification Search

CPC .......... F21S 41/24; F21S 41/265; F21S 41/36; F21S 41/37

See application file for complete search history.

(56) References Cited

U.S. PATENT DOCUMENTS

| | | | | |
|---|---|---|---|---|
| 10,704,764 | B2 * | 7/2020 | Veenstra | F21V 5/04 |
| 2021/0199256 | A1 * | 7/2021 | Son | F21S 41/147 |
| 2022/0003375 | A1 * | 1/2022 | Sugiyama | F21S 41/663 |

FOREIGN PATENT DOCUMENTS

| | | | | |
|---|---|---|---|---|
| KR | 20220133529 A | * 10/2022 | | F21S 41/40 |

* cited by examiner

*Primary Examiner* — Gerald J Sufleta, II

(74) *Attorney, Agent, or Firm* — United One Law Group LLC; Kongsik Kim; Jhongwoo Peck

(57) ABSTRACT

A vehicle lamp includes a plurality of light sources arranged along an up-down direction to generate light; and a plurality of light guiding lenses disposed in front of the plurality of light sources and integrally formed along an arrangement direction of the plurality of light sources. In particular, each of the plurality of light guiding lenses includes: an incident portion onto which light emitted from a corresponding light source among the plurality of light sources is incident; an exit portion disposed in front of the incident portion to output the incident light; and a transmission portion that transmits at least a portion of the light incident on the incident portion to the exit portion. The exit portion is formed to be convex forward.

18 Claims, 28 Drawing Sheets

VEHICLE LAMP

CROSS-REFERENCE TO RELATED APPLICATION

This application claims priority from Korean Patent Application No. 10-2023-0163476, filed on Nov. 22, 2023, which is incorporated herein by reference in its entirety.

BACKGROUND

1. Technical Field

The present disclosure relates to a vehicle lamp, and more particularly, to a vehicle lamp capable of forming an optimal beam pattern while implementing a slim exterior design.

2. Description of the Related Art

Generally, a vehicle includes various lamps having an illumination function and a signaling function. The illumination function enables the driver of the vehicle to more easily detect objects around the vehicle while operating at low-light conditions (e.g., night-time driving), and the signaling function is used to inform other vehicles or road users of the vehicle's driving state.

For example, a headlamp and a fog lamp are designed primarily for the illumination function, and a turn signal lamp, a tail lamp, and a brake lamp are designed primarily for the signaling function. The installation standards and specifications of these vehicle lamps are stipulated by law so that each function can be fully performed.

Recently, consumers' purchase decision in choosing a vehicle has been greatly affected by the aesthetic aspects that consumers perceive from exterior design as well as the functional aspects of helping safe driving by securing the driver's visibility, which is the basic role of vehicle lamps.

Therefore, research is being actively conducted to make a vehicle lamp have a slimmer exterior design and form an optimal beam pattern.

SUMMARY

Aspects of the present disclosure provide a vehicle lamp which prevents stray light from being irradiated to unnecessary (e.g., undesired) regions when light emitted from a plurality of light sources is irradiated through a plurality of optical lenses via a plurality of light guiding lenses to form a beam pattern.

However, aspects of the present disclosure are not restricted to the ones set forth herein. The above and other aspects of the present disclosure will become more apparent to one of ordinary skill in the art to which the present disclosure pertains by referring to the detailed description of the present disclosure given below.

According to an aspect of the present disclosure, a vehicle lamp may include a plurality of light sources arranged along an up-down direction to generate light; and a plurality of light guiding lenses disposed in front of the plurality of light sources and integrally formed along an arrangement direction of the plurality of light sources. Each of the plurality of light guiding lenses may include an incident portion onto which light emitted from a corresponding light source among the plurality of light sources is incident; an exit portion disposed in front of the incident portion to output the incident light; and a transmission portion that transmits at least a portion of the light incident on the incident portion to the exit portion. In particular, the exit portion may be formed to be convex forward.

For each of the plurality of light sources, an optical axis in a left-right direction and an optical axis in the up-down direction may be different.

The plurality of light sources may be slanted such that they are disposed more to one side in a left-right direction going from top to bottom.

The incident portion may include a central surface that is centered on an optical axis of a corresponding light source among the plurality of light sources; a protruding surface formed to protrude from an edge of the central surface toward the corresponding light source; and a reflective surface that reflects light incident on the protruding surface to allow the light to travel toward the exit portion.

The exit portion of at least one of the plurality of light guiding lenses may be formed such that a center line of the exit portion is tilted by a predetermined angle according to an optical axis of a corresponding light source among the plurality of light sources with respect to a horizontal reference line, which is parallel to a front-back direction and passes through a center of the plurality of light guiding lenses in a left-right direction.

The exit portion of at least one of the plurality of light guiding lenses may be formed such that the center line is tilted in a direction toward the horizontal reference line. A tilting direction of the center line of the exit portion of each of the plurality of light guiding lenses may vary according to the optical axis of the corresponding light source with respect to the horizontal reference line. Among the plurality of light guiding lenses, a light guiding lens that corresponds to a light source whose optical axis is disposed on a first side of the horizontal reference line in the left-right direction and a light guiding lens that corresponds to a light source whose optical axis is disposed on a second side of the horizontal reference line in the left-right direction may be formed such that center lines of the exit portions thereof are tilted in opposite directions.

The vehicle lamp may further include a plurality of optical lenses, and each of the plurality of optical lenses may allow light output from a corresponding light guiding lens among the plurality of light guiding lenses to be transmitted therethrough to form a predetermined beam pattern. An incident surface of at least one of the plurality of optical lenses may be formed such that an up-down curvature thereof is tilted to either side of a vertical line in a left-right direction.

A tilting direction of the up-down curvature of each of the plurality of optical lenses may vary according to a direction in which an optical axis of a corresponding light source among the plurality of light sources is disposed with respect to a vertical reference line, which is parallel to a front-back direction and passes through a center of the plurality of light guiding lenses in the up-down direction. Among the plurality of optical lenses, an optical lens that corresponds to a light source whose optical axis is disposed above the vertical reference line and an optical lens that corresponds to a light source whose optical axis is disposed below the vertical reference line may be formed such that up-down curvatures thereof are tilted in opposite directions with respect to the vertical line.

A tilting direction of the up-down curvature of each of the plurality of optical lenses may vary according to a direction in which an optical axis of a corresponding light source among the plurality of light sources is disposed with respect to a horizontal reference line, which is parallel to a front-back direction and passes through the center of the plurality of light guiding lenses in the left-right direction. Each of the optical lenses may be tilted to a side of the vertical line in a direction toward the horizontal reference line. The tilting direction of the up-down curvature of each of the plurality of optical lenses may vary according to an optical axis of a corresponding light source among the plurality of light sources with respect to a vertical reference line, which is parallel to the front-back direction and passes through the center of the plurality of light guiding lenses in the up-down direction.

The plurality of light guiding lenses may include a first light guiding lens and a second light guiding lens disposed adjacent to each other in the up-down direction, and a shield hole may be formed between the first light guiding lens and the second light guiding lens to block at least a portion of light incident on the first light guiding lens.

A lowermost light guiding lens among the plurality of light guiding lenses may include a shield portion formed as a recess on a bottom surface to block at least a portion of light that is incident on the incident portion.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
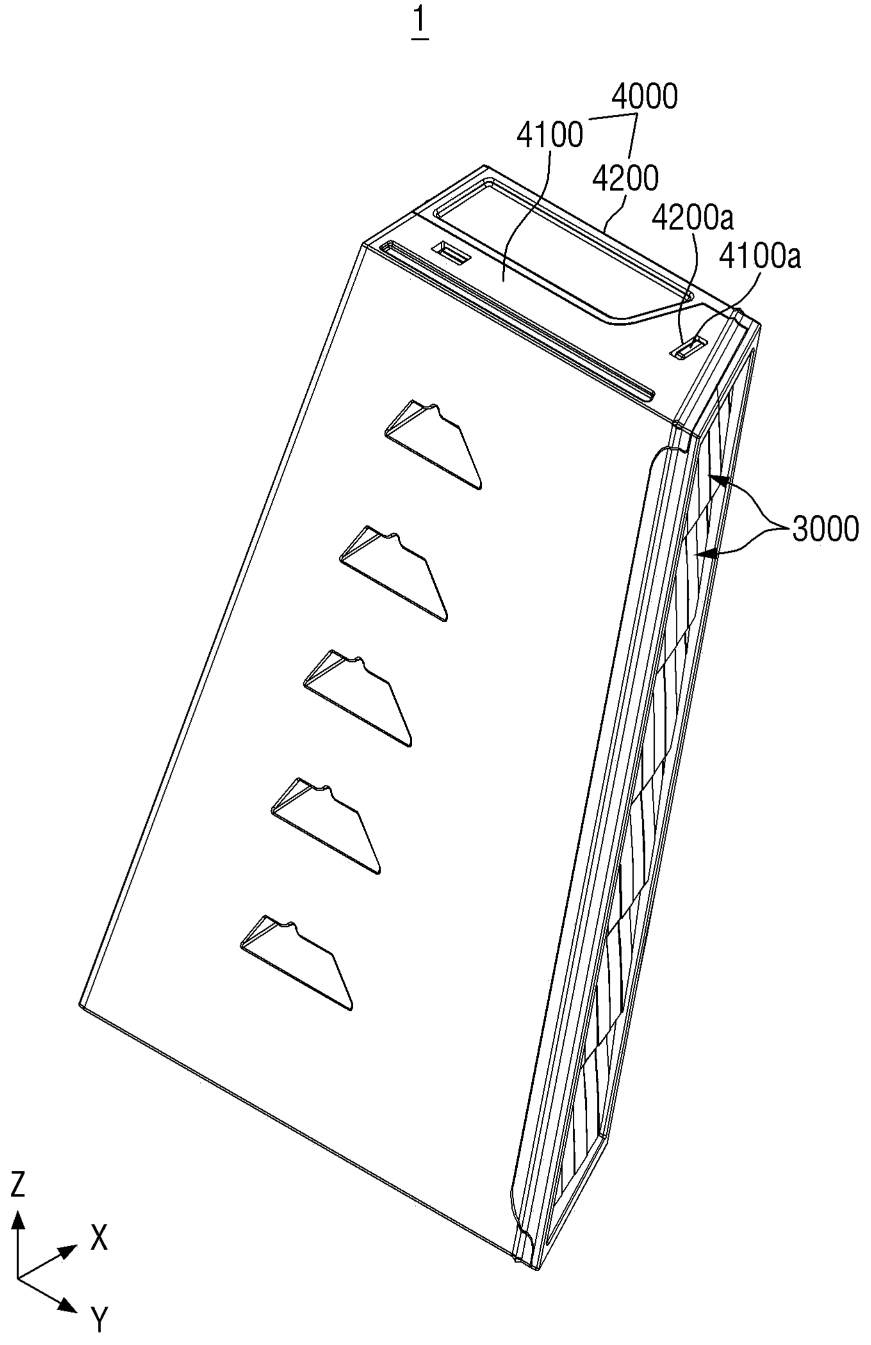
FIGS. 1 and 2 are perspective views of a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the preset disclosure will be described with reference to the drawings for describing vehicle lamps according to embodiments of the present disclosure.

Figure 2:
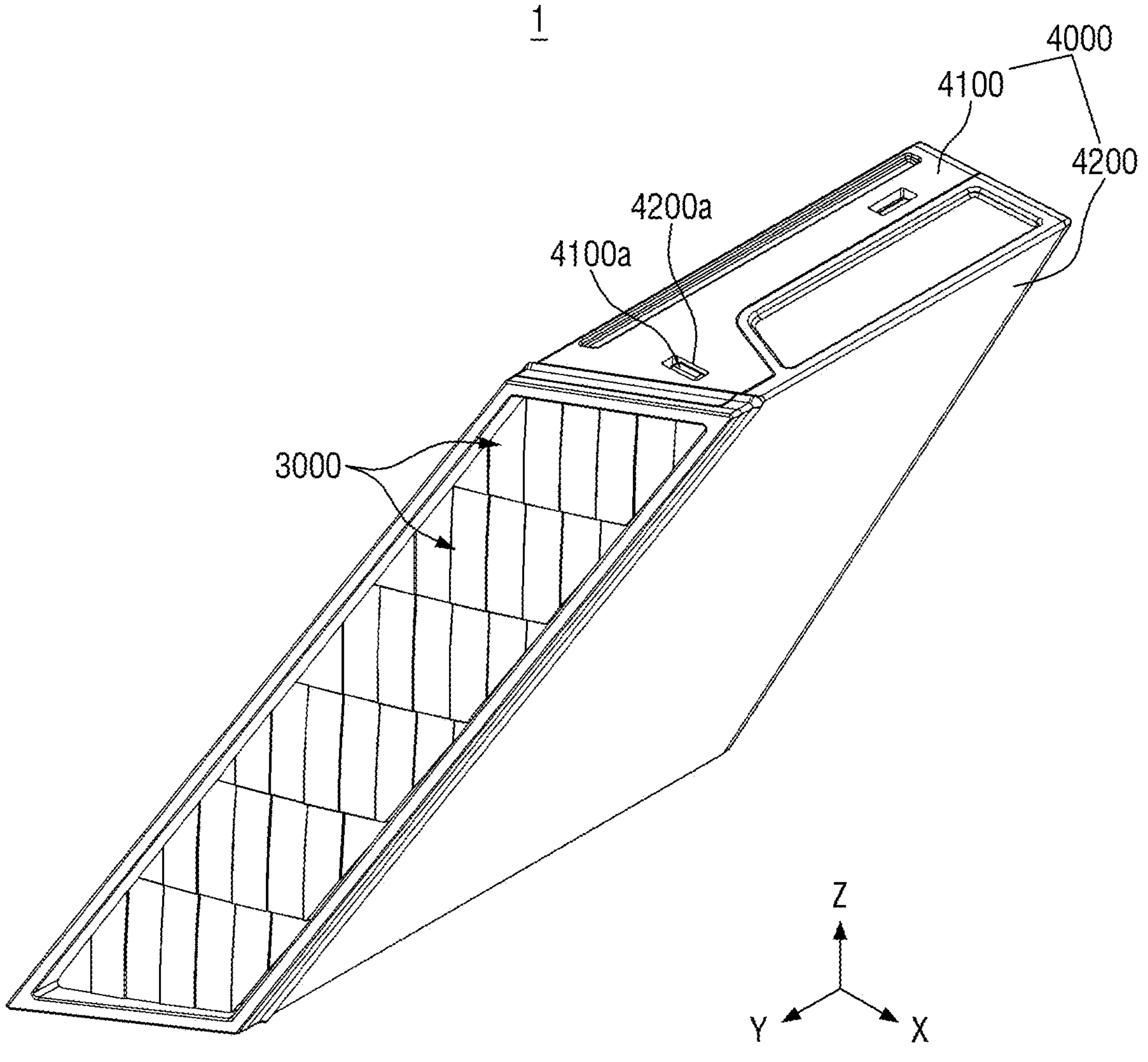
Figure 3:
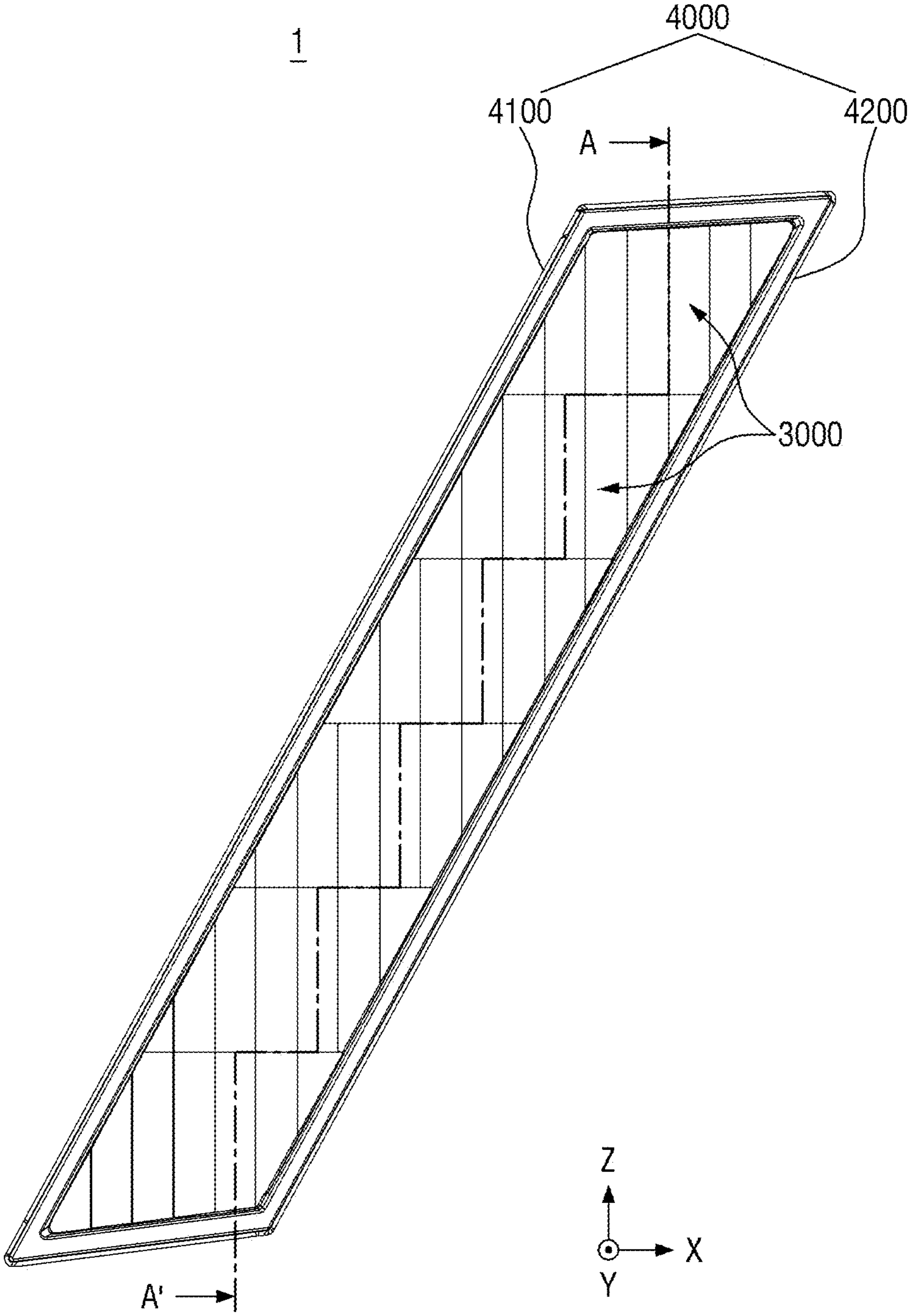
FIG. 3 is a front view of the vehicle lamp according to the embodiment of the present disclosure.
Figure 4:
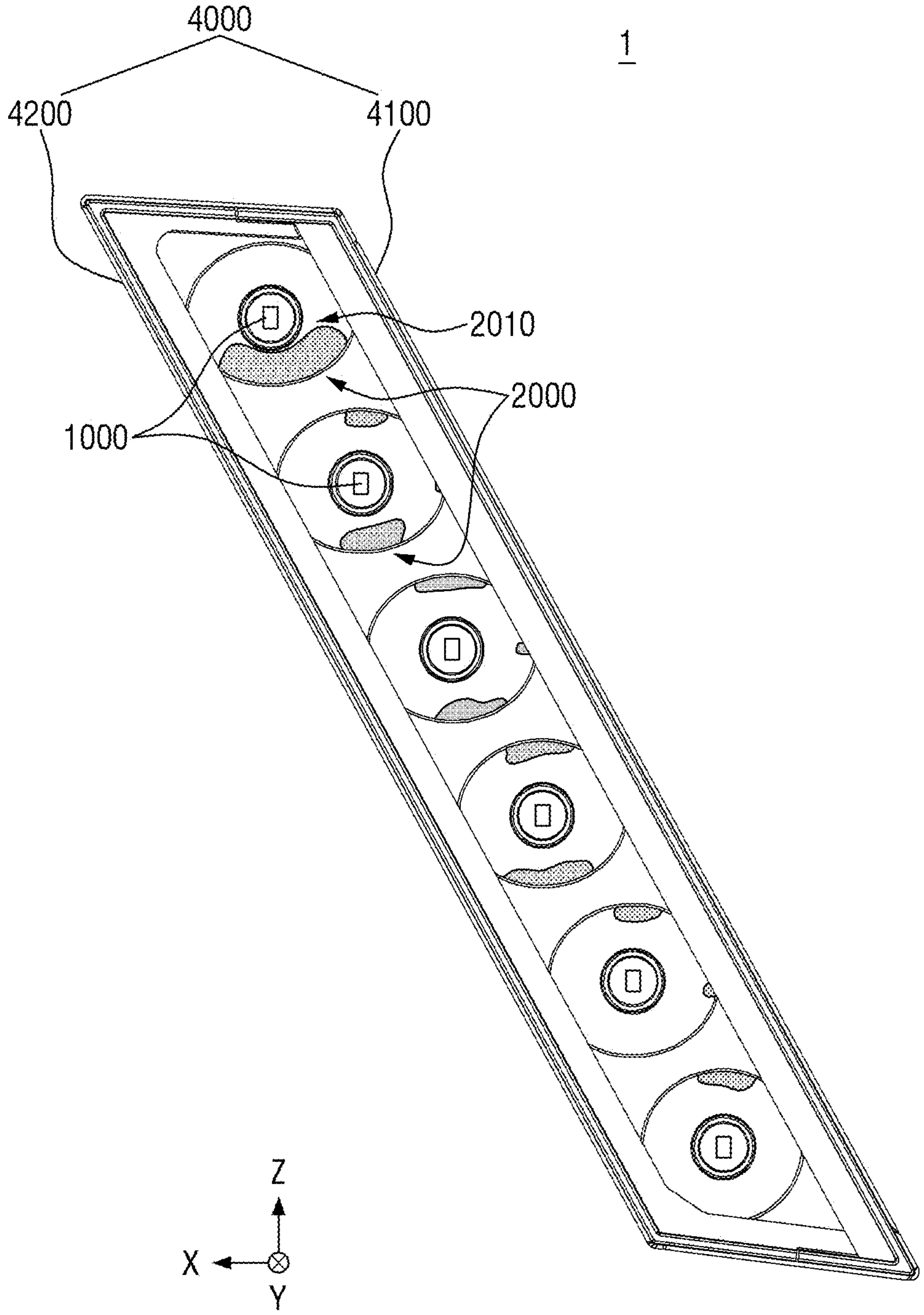
FIG. 4 is a rear view of the vehicle lamp according to the embodiment of the present disclosure.
Figure 5:
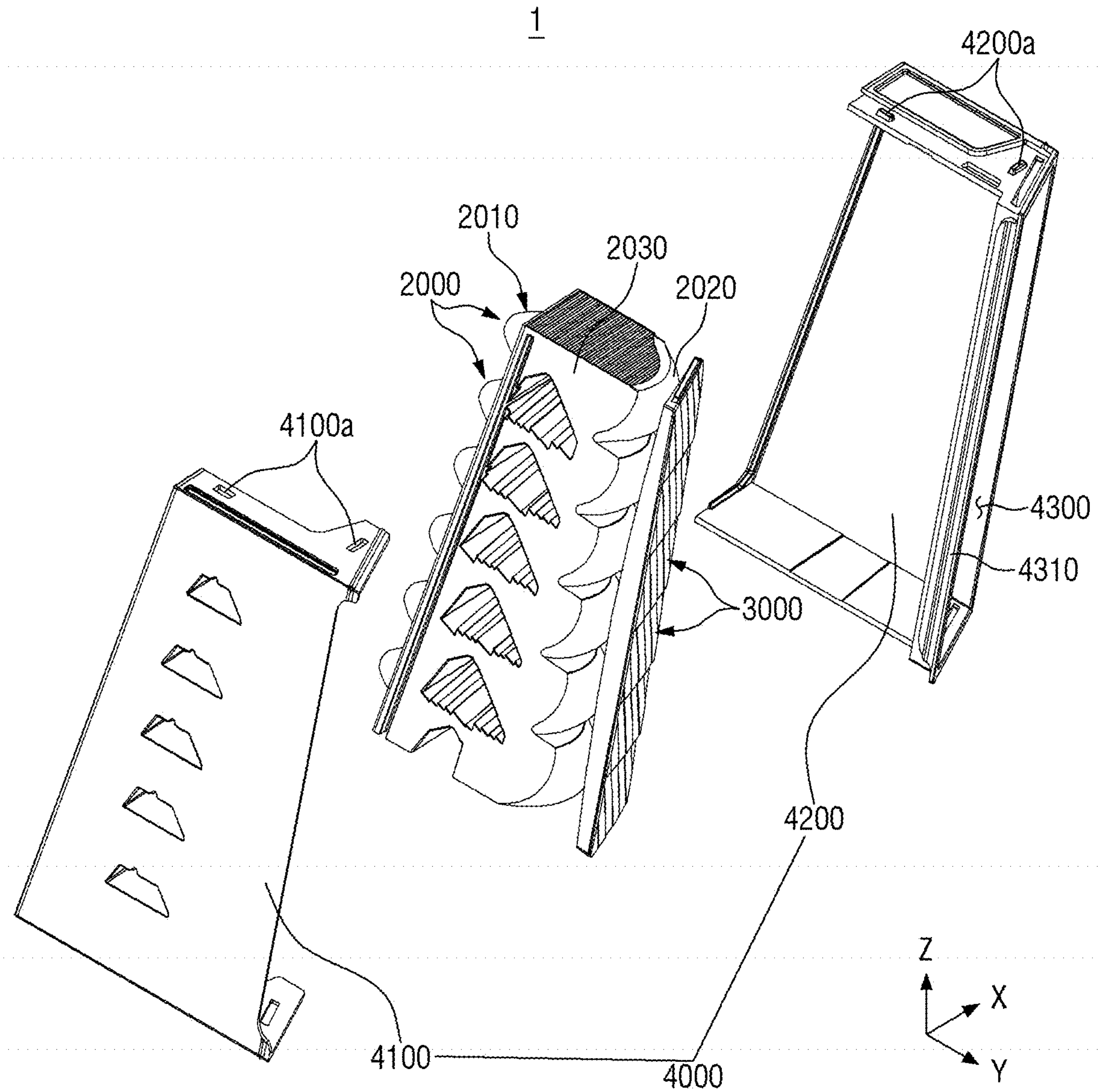
FIGS. 5 and 6 are exploded perspective views of the vehicle lamp according to the embodiment of the present disclosure.
Figure 6:
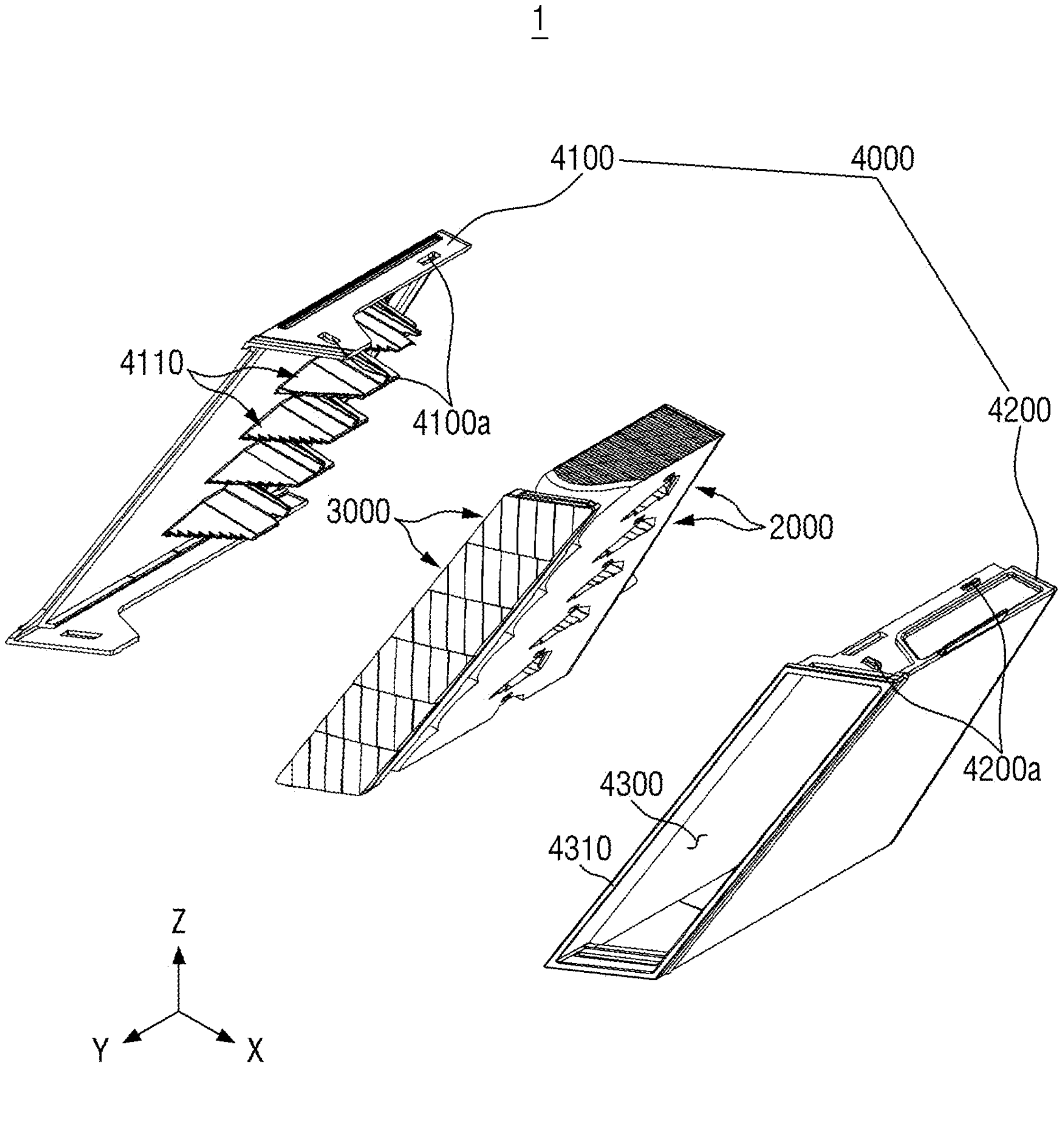
Figure 7:
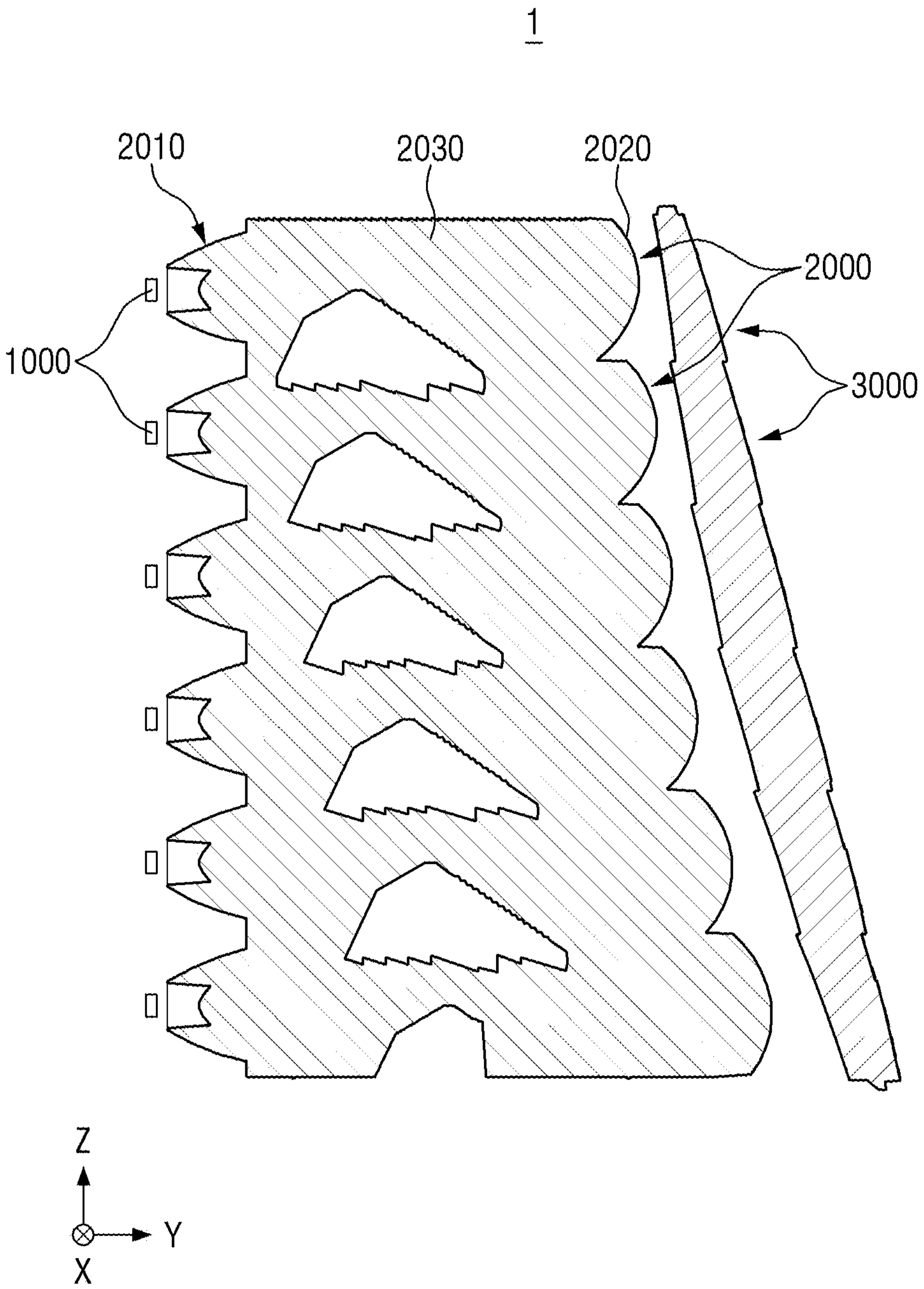
FIG. 7 is a cross-sectional view taken along line A-A' of FIG. 3.

FIGS. 1 and 2 are perspective views of a vehicle lamp 1 according to an embodiment of the present disclosure. FIG. 3 is a front view of the vehicle lamp 1 according to the embodiment of the present disclosure. FIG. 4 is a rear view of the vehicle lamp 1 according to the embodiment of the present disclosure. FIGS. 5 and 6 are exploded perspective views of the vehicle lamp 1 according to the embodiment of the present disclosure. FIG. 7 is a cross-sectional view taken along line A-A' of FIG. 3. FIG. 7 is an example of a case where a mounting bracket 4000 is omitted.

Referring to FIGS. 1 through 7, the vehicle lamp 1 according to the embodiment of the present disclosure may include a plurality of light sources 1000, a plurality of light guiding lenses 2000, and a plurality of optical lenses 3000. At least one of these components may be accommodated in a space formed by a mounting bracket 4000.

In the embodiment of the present disclosure, a case where the vehicle lamp 1 is used as a headlamp will be described as an example, wherein the headlamp irradiates light in a driving direction of the vehicle to secure the driver's view ahead when the vehicle is operated at low-light conditions (e.g., night-time driving). In addition, a case where an X-axis direction is a left-right direction (e.g., lateral direction) and refers to a vehicle width direction, a Y-axis direction is a front-back direction (e.g., longitudinal direction) and refers to a driving direction, and a Z-axis direction is an up-down direction (e.g., vertical direction) and refers to a vehicle height direction will be described as an example. However, the present disclosure is not limited thereto, and the directions actually indicated by an X axis, a Y axis, and a Z axis may vary depending on the installation position and/or direction of the vehicle lamp 1 of the present disclosure.

In the embodiment of the present disclosure, the case where the vehicle lamp 1 is used as a headlamp is merely an example used to help understand the present disclosure, and the present disclosure is not limited thereto. The vehicle lamp 1 of the present disclosure can be used not only as a headlamp but also as various other lamps installed in a vehicle, such as a tail lamp, a brake lamp, a turn signal lamp, a fog lamp, a backup lamp, and a position lamp.

Figure 8:
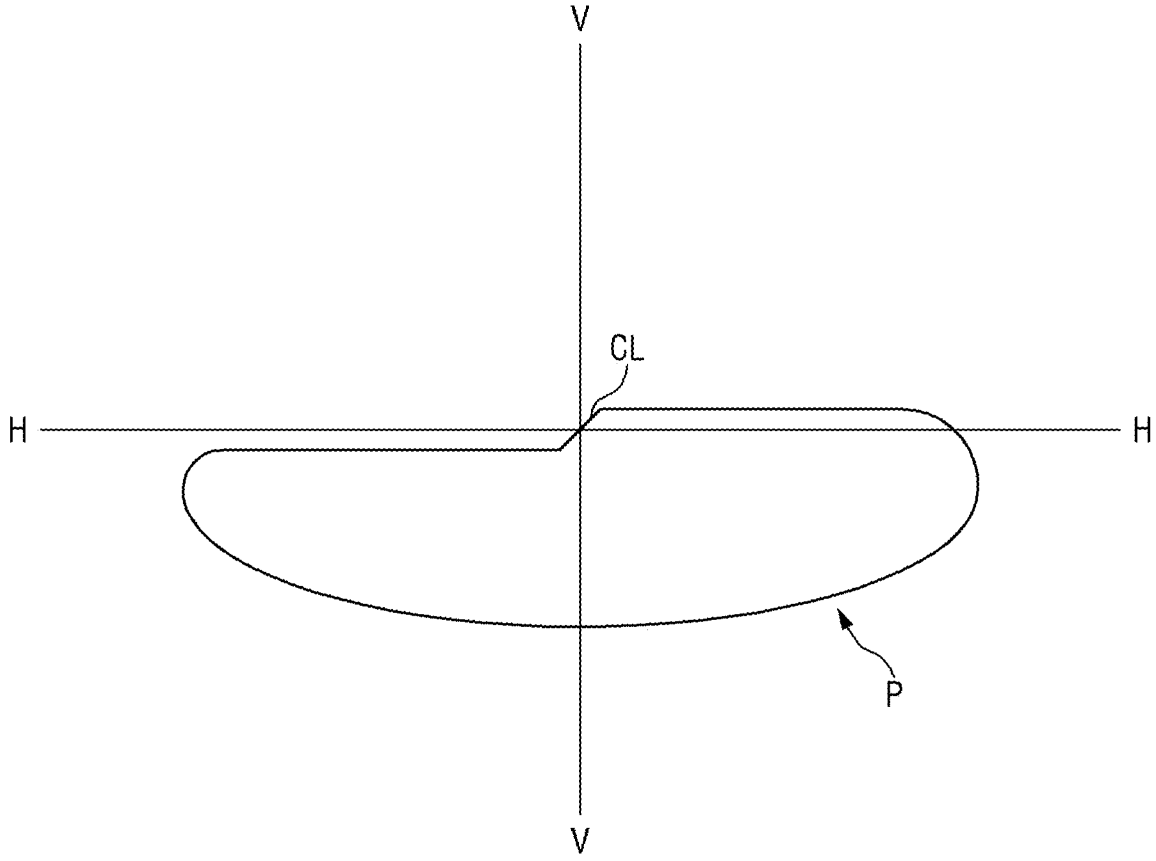
FIG. 8 is a schematic diagram illustrating a beam pattern formed by the vehicle lamp according to the embodiment of the present disclosure.

When the vehicle lamp 1 of the present disclosure is used as a headlamp, it may form a low beam pattern to secure a wide field of view for a relatively short distance in front of the vehicle by irradiating light below a cutoff line so as not to dazzle drivers of the vehicles ahead such as preceding vehicles or oncoming vehicles and/or may form a high beam pattern to secure a long field of view for a relatively long distance in front of the vehicle. In the embodiment of the present disclosure, a case where the vehicle lamp 1 forms a low beam pattern P in which light is irradiated below a cutoff line CL as illustrated in FIG. 8 will be described as an example.

The light sources 1000 may generate light of an amount and/or color suitable for the use of the vehicle lamp 1 of the present disclosure. In the embodiment of the present disclosure, a case where the light sources 1000 are disposed substantially along the up-down direction, and slanted toward one side along the left-right direction from top to bottom will be described as an example. This is to ensure that the light sources 1000 are formed along a body line of the vehicle.

For example, the vehicle lamp 1 of the present disclosure may be accommodated in an internal space formed by a lamp housing and a cover lens assembled to the lamp housing. Therefore, it may be understood that the light sources 1000 are disposed as described above to ensure that the light sources 1000 are disposed according to the shape of the cover lens that forms a part of the body contour of the vehicle. In other words, when the cover lens is shaped as a flat surface facing directly forward, the light sources 1000 may be disposed along the up-down direction with no or little slant in the left-right direction. However, when the cover lens is shaped as a flat or curved surface that is inclined with respect to the front, the light sources 1000 may be slanted to one side in the left-right direction, going from one side toward the other side in the up-down direction.

When the light sources 1000 are disposed along the body line of the vehicle, it may be understood that the light guiding lenses 2000 and the optical lenses 3000 are also disposed along the body line of the vehicle. This will be described in detail later.

Here, since the light sources 1000, the light guiding lenses 2000, and the optical lenses 3000 are disposed in one direction, the vehicle lamp 1 of the present disclosure can be implemented in a slim form factor in the direction, thereby achieving aesthetic improvements.

In the embodiment of the present disclosure, a case where semiconductor light emitting elements such as light emitting diodes (LEDs) are used as the light sources 1000 will be described as an example. However, the present disclosure is not limited thereto. Not only LEDs but also various other types of light sources such as laser diodes (LDs) or bulbs may also be used as the light sources 1000. In addition, an optical element such as a reflector, a prism, a mirror, or a phosphor may be additionally included depending on the type of light source in order to control the path, brightness, color, etc. of light.

Figure 9:
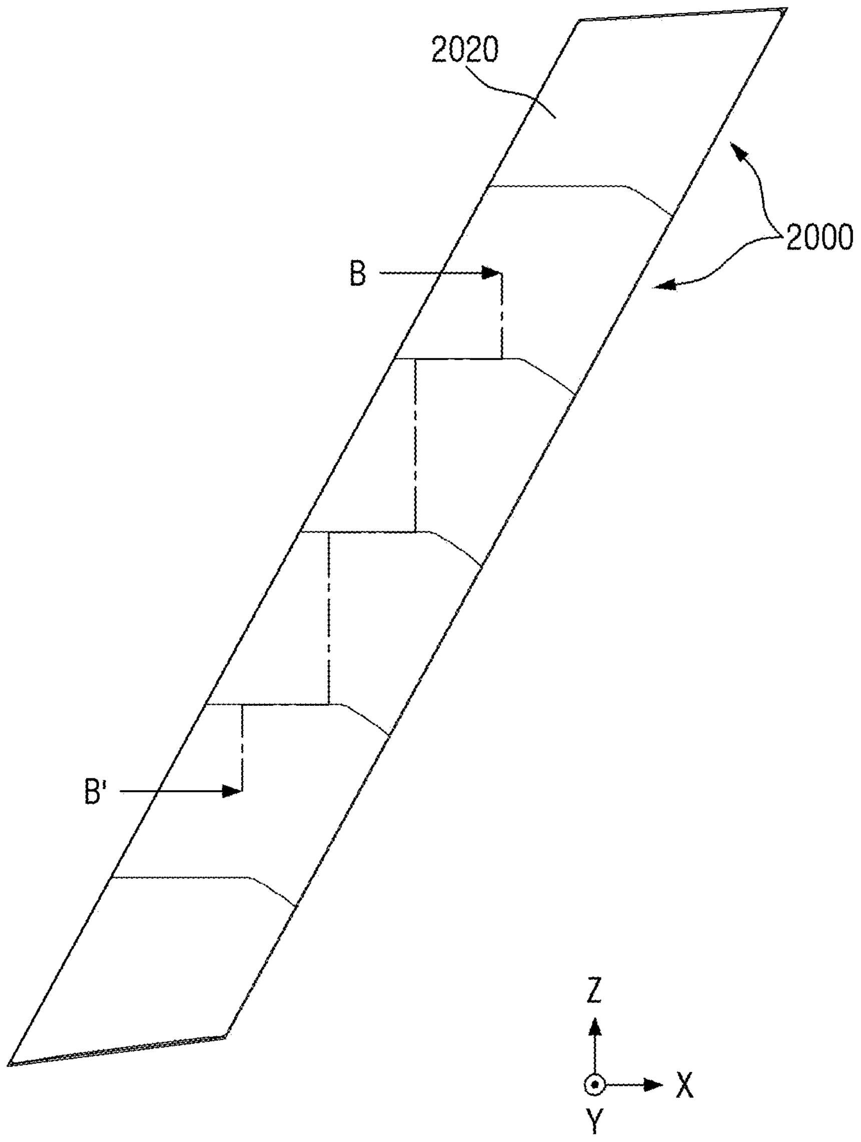
FIG. 9 is a front view of a plurality of light guiding lenses according to an embodiment of the present disclosure.
Figure 10:
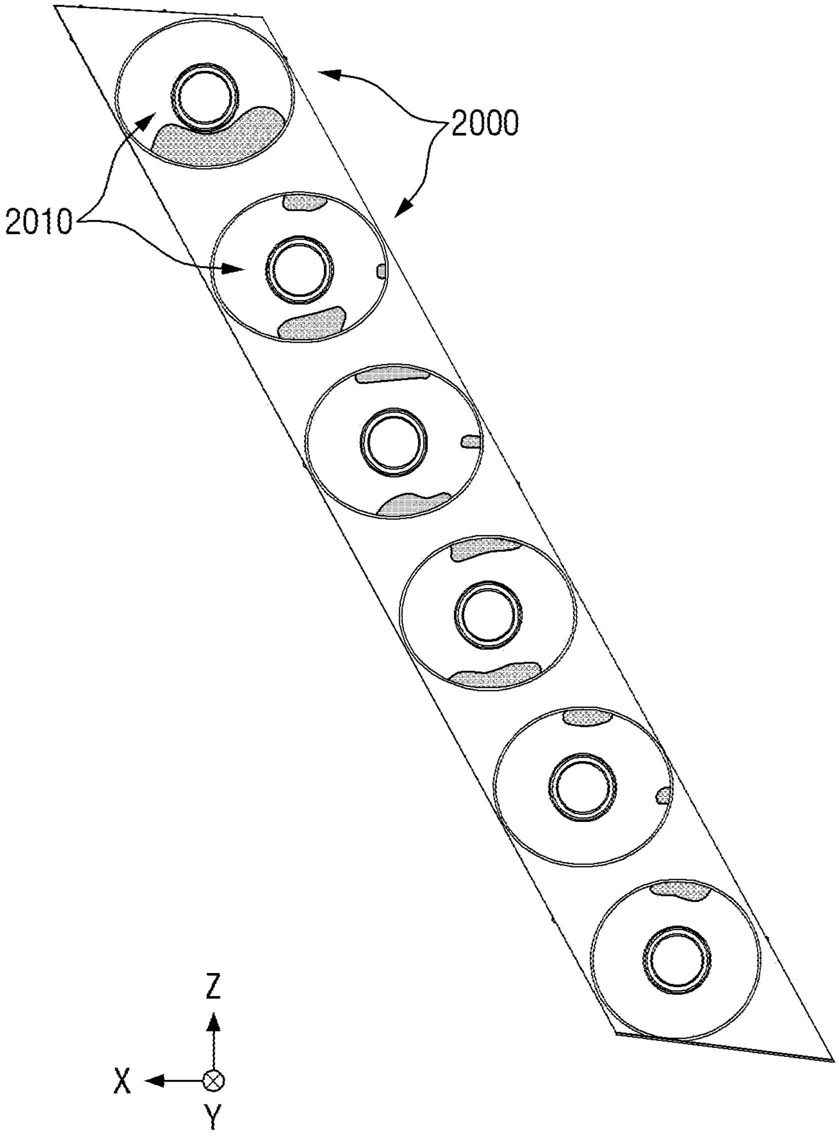
FIG. 10 is a rear view of the light guiding lenses according to the embodiment of the present disclosure.
Figure 11:
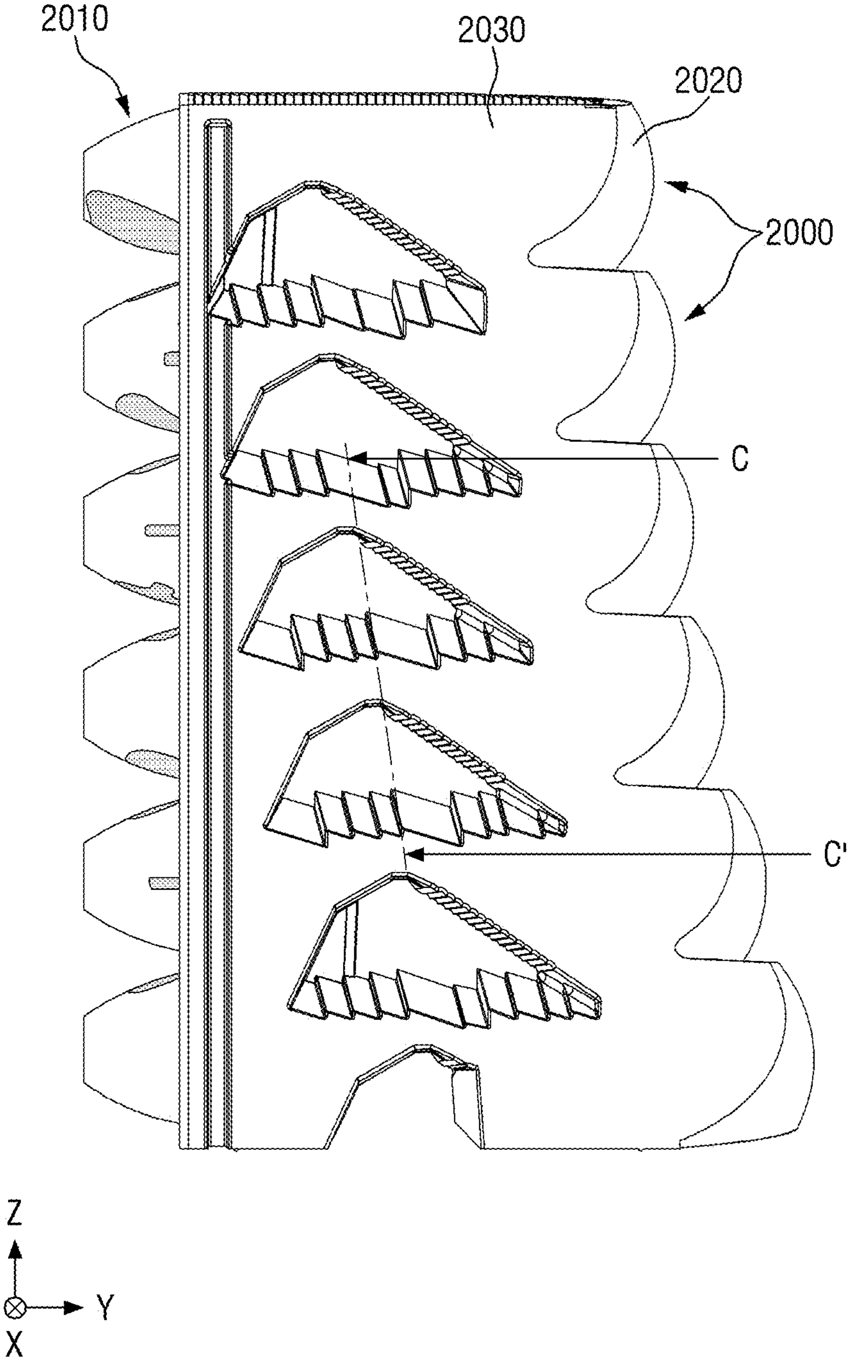
FIG. 11 is a side view of the light guiding lenses according to the embodiment of the present disclosure.
Figure 12:
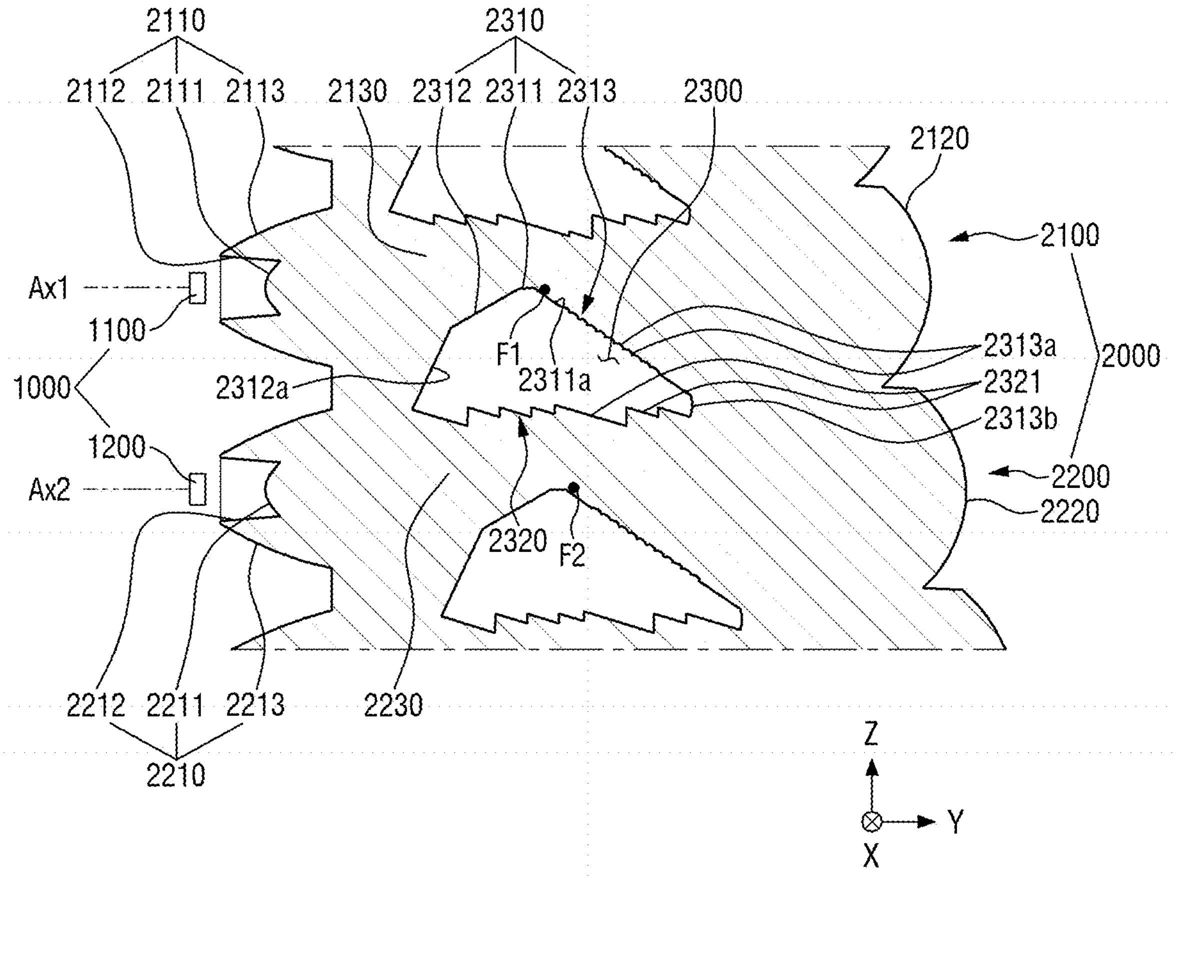
FIG. 12 is a cross-sectional view taken along line B-B' of FIG. 9.
Figure 13:
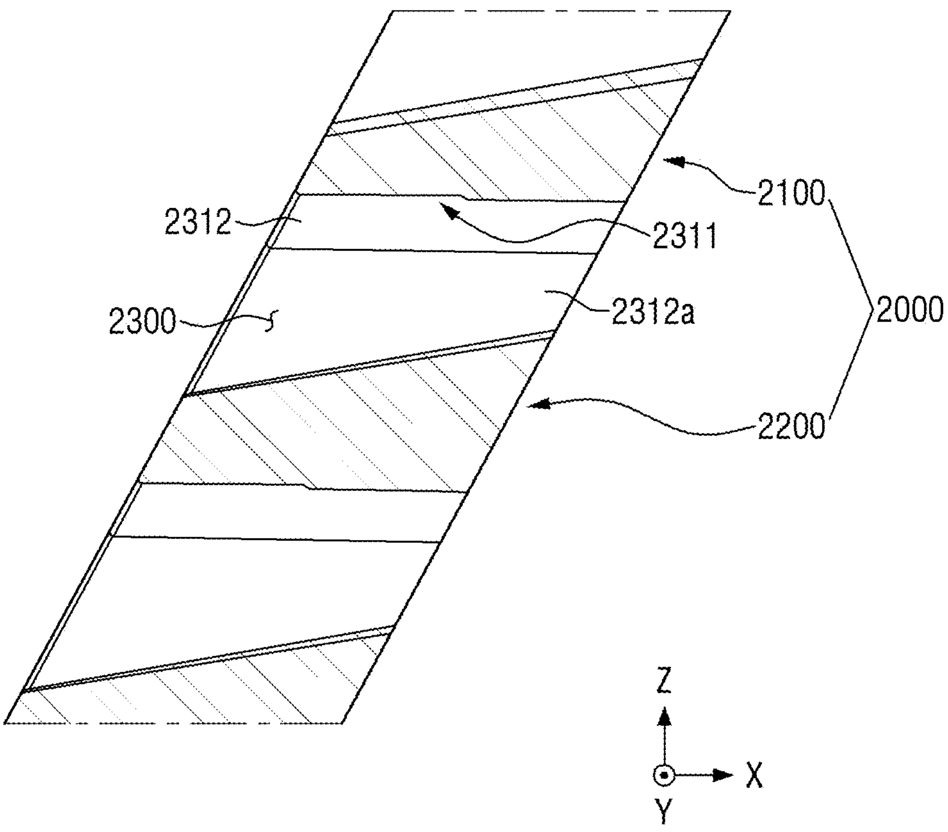
FIG. 13 is a cross-sectional view taken along line C-C' of FIG. 11.
Figure 14:
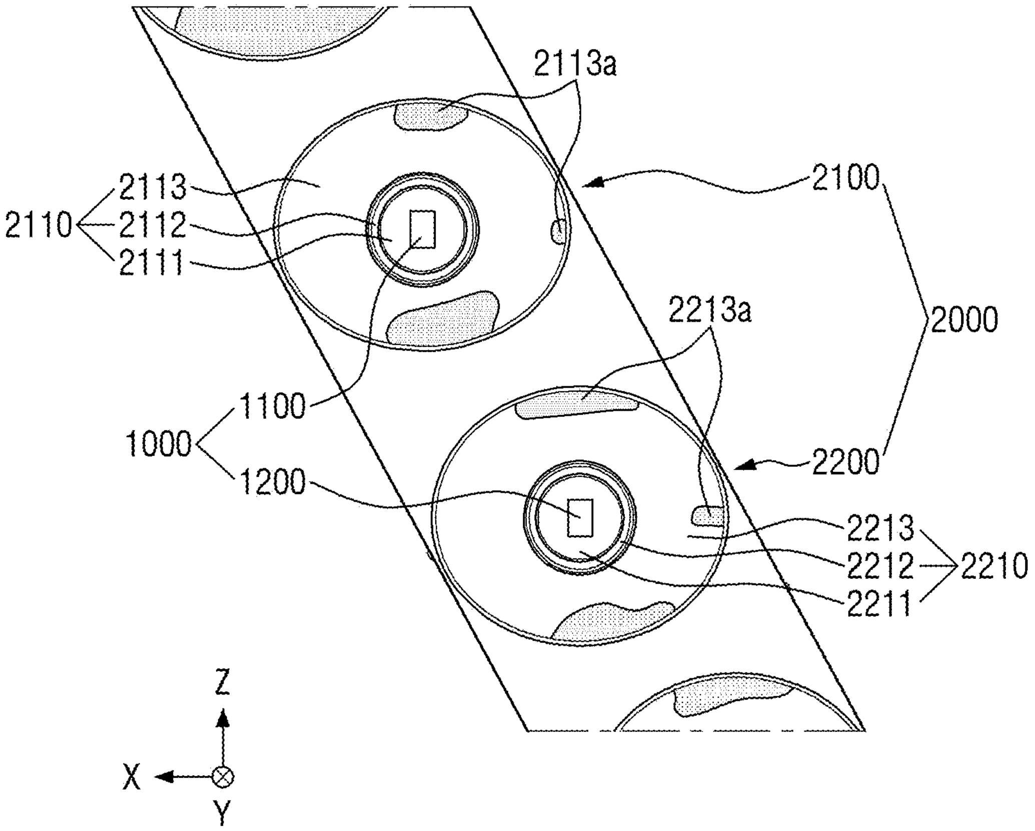
FIG. 14 is a rear view of a first light guiding lens and a second light guiding lens according to an embodiment of the present disclosure.

FIG. 9 is a front view of a plurality of light guiding lenses 2000 according to an embodiment of the present disclosure. FIG. 10 is a rear view of the light guiding lenses 2000 according to the embodiment of the present disclosure. FIG. 11 is a side view of the light guiding lenses 2000 according to the embodiment of the present disclosure. FIG. 12 is a cross-sectional view taken along line B-B' of FIG. 9. FIG. 13 is a cross-sectional view taken along line C-C' of FIG. 11. FIG. 14 is a rear view of a first light guiding lens 2100 and a second light guiding lens 2200 according to an embodiment of the present disclosure.

Referring to FIGS. 9 through 14, the light guiding lenses 2000 according to the embodiment of the present disclosure may be disposed in front of the light sources 1000, respectively, so that each of the light guiding lenses 2000 can output light incident from a corresponding light source among the plurality of light sources 1000.

The light guiding lenses 2000 may be integrally formed in the up-down direction along the arrangement direction of the light sources 1000. The light guiding lenses 2000 may be disposed more toward one side along the left-right direction going from top to bottom for a similar reason as described above with regards to the light sources 1000.

Each of the light guiding lenses 2000 may include an incident portion 2010 onto which light emitted from a corresponding light source among the light sources 1000 is incident, and an exit portion 2020 disposed in front of the incident portion 2010 to output the light incident on the incident portion 2010. A transmission portion 2030 disposed between the incident portion 2010 and the exit portion 2020 may transmit at least a portion of the light incident on the incident portion 2010 to the exit portion 2020.

The incident portion 2010 of each of the light guiding lenses 2000 may be spaced apart from a corresponding light source among the light sources 1000 by a predetermined distance in order to prevent interference between the light emitted from the corresponding light source.

In each of the light guiding lenses 2000, the incident portion 2010 and the exit portion 2020 may be connected by the transmission portion 2030 and thus may be integrally formed with one another. Accordingly, the number of parts can be reduced, and the assembly process can be simplified.

In addition, the exit portion 2020 of each of the light guiding lenses 2000 may be shaped as a curved surface that is convex forward to focus the light that is output.

Here, the incident portion 2010 of each of the light guiding lenses 2000 may be spaced apart from a corresponding light source among the light sources 1000 by a predetermined distance along the front-back direction. This configuration is to prevent structural interference between the light source and the light guiding lens corresponding to each other among the light sources 1000 and the light guiding lenses 2000 while improving heat dissipation characteristics. In other words, if each of the light sources 1000 at least partially overlaps the incident portion 2010 of a corresponding light guiding lens among the light guiding lenses 2000 in the front-back direction, the heat generated when light is emitted from each of the light sources 1000 may not be quickly released to the outside due to the incident portion 2010, resulting in poorer heat dissipation. Therefore, the incident portion 2010 of each of the light guiding lenses 2000 may be spaced apart from a corresponding light source among the light sources 1000 by a predetermined distance in the front-back direction.

The light guiding lenses 2000 may be formed to have greater lengths in the front-back direction as they go from top to bottom. This configuration arises from the configuration that the light sources 1000 are disposed at the same longitudinal position while the optical lenses 3000 are disposed more forward going from top to bottom. In other words, when the optical lenses 3000 are disposed more forward as they go from top to bottom along the body line of the vehicle, the exit portions 2020 of the light guiding lenses 2000 need to be disposed more forward going from top to bottom as well. However, where the light sources 1000 have the same position in the front-back direction so that they can be installed on a single common substrate, the light guiding lenses 2000 have greater lengths in the front-back direction as they from top to bottom so that their exit portions 2020 may be disposed more forward top to bottom.

The light sources 1000 may be installed on a single common substrate to reduce the number of parts compared with a case where an individual substrate is used for each of the light sources 1000. The use of a single common substrate may also reduce costs and simplify the assembly process.

The light guiding lenses 2000 may include a first light guiding lens 2100 and a second light guiding lens 2200 disposed below the first light guiding lens 2100. In the following embodiment of the present disclosure, a case where the first light guiding lens 2100 and the second light guiding lens 2200 are collectively referred to as two light guiding lenses integrally formed so that they are disposed adjacent to each other in the up-down direction among the light guiding lenses 2000 will be described as an example.

The first light guiding lens 2100 may include a first incident portion 2110, a first exit portion 2120, and a first transmission portion 2130. The first incident portion 2110 may focus light incident from a corresponding first light source 1100 among the light sources 1000 at or near a rear focus F1 of the first exit portion 2120.

Herein, the rear focus F1 of the first exit portion 2120 may have a shape of a point, a line, a plane, a space, or a combination thereof depending on an area where light is to be focused. In the following embodiment of the present disclosure, a case where a focus has the shape of a point, a line, a plane, a space, or a combination thereof, similar to the rear focus F1 of the first exit portion 2120, will be described as an example.

The first incident portion 2110 may include a first central surface 2111 centered on an optical axis Ax1 of the first light source 1100 that corresponds to the first light guiding lens 2100 among the light sources 1000, a first protruding surface 2112 formed to protrude from the edge of the first central surface 2111 toward the first light source 1100, and a first reflective surface 2113 that reflects light incident on the first protruding surface 2112 to allow the light to travel toward the first exit portion 2120. The first reflective surface 2113 may be formed to be spaced apart from the optical axis Ax1 by a greater distance going from a rear end toward a front end thereof along the direction of the optical axis Ax1 of the first light source 1100, in order to facilitate the light incident on the first protruding surface 2112 to travel forward.

Further, as shown in FIG. 14, the first reflective surface 2113 may include a first corrosion portion 2113*a* formed on at least a portion thereof. When at least a portion of unnecessary (e.g., undesired) light among the light incident on the first protruding surface 2112 is transmitted to the outside of the first light guiding lens 2100 without being reflected by the first reflective surface 2113, it may cause glare or the like. To address such an issue, the first corrosion portion 2113*a* may serve to eliminate or reduce such unnecessary light in advance. In the embodiment of the present disclosure, the first corrosion portion 2113*a* may be formed above and/or below the optical axis Ax1 of the first light source 1100, and an area where the first corrosion portion 2113*a* is formed on at least one of upper or lower portion of the first reflective surface 2113 may be variously changed.

The first transmission portion 2130 may transmit at least a portion of the light that is incident through the first incident portion 2110 to the first exit portion 2120. Since the first incident portion 2110 and the first exit portion 2120 may be integrally formed by being connected by the first transmission portion 2130, the number of parts can be reduced, and the assembly process can be simplified compared with a configuration where the first incident portion 2110 and the first exit portion 2120 are formed separately and then assembled.

Like the first light guiding lens 2100 described above, the second light guiding lens 2200 may include a second incident portion 2210, a second exit portion 2220, and a second transmission portion 2230. The second incident portion 2210 may include a second central surface 2211 centered on an optical axis Ax2 of a second light source 1200 that corresponds to the second light guiding lens 2200 among the light sources 1000, and a second protruding surface 2212 formed to protrude from the edge of the second central surface 2211 toward the second light source 1200. A second reflective surface 2213 that reflects light incident on the second protruding surface 2212 may allow the light to travel toward the second exit portion 2220.

Although the second central surface 2211, the second protruding surface 2212, and the second reflective surface 2213 may have some differences in shape from the first central surface 2111, the first protruding surface 2112, and the first reflective surface 2113 described above, respectively, they may have similar roles, and a detailed description thereof will be omitted.

In addition, like the first reflective surface 2113 described above, the second reflective surface 2213 may include a second corrosion portion 2213*a*. When at least a portion of unnecessary light among the light incident on the second protruding surface 2212 is transmitted to the outside of the second light guiding lens 2200 without being reflected by the second reflective surface 2213, it may cause glare or the like. The second corrosion portion 2213*a* may serve to eliminate or reduce such unnecessary light in advance. The second corrosion portion 2213*a* may be formed at similar positions and areas as the first corrosion portion 2113*a* or may be formed differently from the first corrosion portion 2113*a* in terms of at least one of the formation position or the area. FIG. 14 is an example of a case where the first corrosion portion 2113*a* and the second corrosion portion 2213*a* are different in both the formation positions and the areas.

Like the first incident portion 2110 described above, the second incident portion 2210 may focus light incident from the second light source 1200 among the light sources 1000 at or near a rear focus F2 of the second exit portion 2220.

In order for the vehicle lamp 1 of the present disclosure to form the low beam pattern P of FIG. 8 described above, a portion of light incident from each of the light guiding lenses 2000 may be blocked (e.g., obstructed) above the cutoff line CL. When the first light guiding lens 2100 and the second light guiding lens 2200 are formed integrally as described above, a shield hole (e.g., void) 2300 may be formed between the first light guiding lens 2100 and the second light guiding lens 2200 to block at least a portion of the light incident through the first light guiding lens 2100.

In the embodiment of the present disclosure, a case where the shield hole 2300 is formed between the first light guiding lens 2100 and the second light guiding lens 2200 among the plurality of light guiding lenses 2000 will be described as an example. However, the present disclosure is not limited thereto. A shield hole may be formed between any adjacent light guiding lenses, for example, between the first light guiding lens 2100 and an adjacent light guiding lens above the first light guiding lens 2100, and between the second light guiding lens 2200 and an adjacent light guiding lens below the second light guiding lens 2200.

The shield hole 2300 may be formed to expand in a direction in which a mold is separated during the injection molding process of the light guiding lenses 2000. Therefore, the formation of an undercut can be prevented during the injection molding of the light guiding lenses 2000.

The shield hole 2300 may include a shield portion 2310 and a connection portion 2320. The shield portion 2310 may be formed to slope approximately downward in both forward and backward directions from an apex disposed at or near the rear focus F1 of the first exit portion 2120. The connection portion 2320 may connect both ends (e.g., both lower ends) of the shield portion 2310 in the front-back direction so that the shield hole 2300 has approximately a triangular shape as a whole. A lowermost light guiding lens among the light guiding lenses 2000 may be formed to have a concave shape (e.g., a recess) due to the shield portion 2310 since the connection portion 2320 is omitted from the shield hole 2300.

The shield portion 2310 may include a shield reflection portion 2311, a light extraction portion 2312, and a diffusion portion 2313. The shield reflection portion 2311 may be formed to slope downward in the backward direction (i.e., toward the light source 1000) from a front (e.g., distal) end disposed at or near the rear focus F1 of the first exit portion 2120. The front end of the shield reflection portion 2311 may correspond to the apex of the shield portion 2310 and may be disposed closest to the optical axis Ax1 of the first light source 1100.

The front end of the shield reflection portion 2311 may be disposed at or near the rear focus F1 of the first exit portion 2120 to cause the cutoff line CL of the low beam pattern P to be formed. In the embodiment of the present disclosure, as shown in FIG. 13, a case where a step is formed so that the front end of the shield reflection portion 2311 has different heights on both sides with respect to a center in the left-right direction will be described as an example.

In other words, the shield reflection portion 2311 may be formed to have a step in the lateral direction to ensure that the cutoff line CL of the low beam pattern P formed by the vehicle lamp 1 of the present disclosure has different heights on both sides with respect to a center as shown in FIG. 8. However, the present disclosure is not limited thereto. Depending on the desired or required shape of the cutoff line CL to be formed, the shield reflection portion 2311 may be formed to have the constant height in the left-right direction, or different parts thereof may be formed to have different heights.

In the embodiment of the present disclosure, a case where the shield hole 2300 is formed to have a larger size in the direction in which the mold is separated is described as an example. However, the present disclosure is not limited thereto. The shield hole 2300 may also be formed to have a larger size in a direction from one side having a lower height to the other side having a higher height in order to prevent an undercut from being formed due to a step when the front end of the shield reflection portion 2311 is formed to have different heights on both sides with respect to the center.

Figure 15:
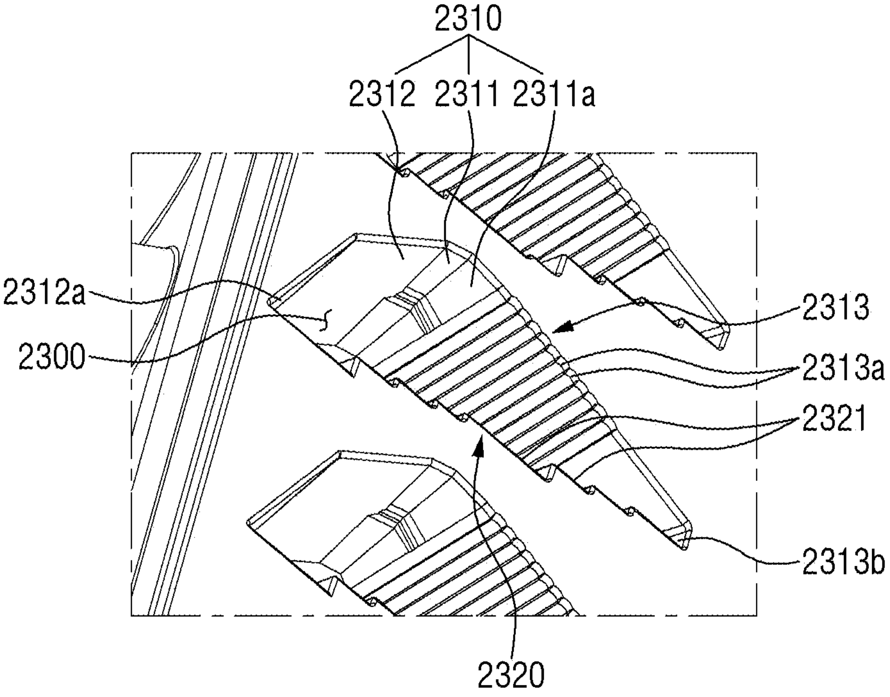
FIG. 15 is a perspective view illustrating an extension portion formed in front of a shield reflection portion according to an embodiment of the present disclosure.

If the step of the shield reflection portion 2311 is eliminated at the rear focus F1 of the first exit portion 2120, there is a possibility that some of the light that passes through the rear focus F1 may be blocked. Therefore, an extension portion 2311*a* may be formed in front of the shield reflection portion 2311 to slope downward from the front end of the shield reflection portion 2311. The extension portion 2311*a* may allow the step of the shield reflection portion 2311 to extend to a certain point in front of the shield reflection portion 2311, as illustrated in FIG. 15.

The shield reflection portion 2311 described above may be formed to slope downward in the backward direction from the front end so that some of the light incident on the first incident portion 2110 and traveling to be focused on the rear focus F1 of the first exit portion 2120 can be reflected toward the first exit portion 2120. This configuration is to prevent the light for forming a beam pattern suitable for the use of the vehicle lamp 1 of the present disclosure from being blocked and thus reducing the light efficiency. In other words, the first light source 1100 may be considered as a substantially surface light source whose emission surface has a certain area, and a propagation surface through which the light emitted from the first light source 1100 is propagated may be understood to have a size corresponding to that of the emission surface.

Figure 16:
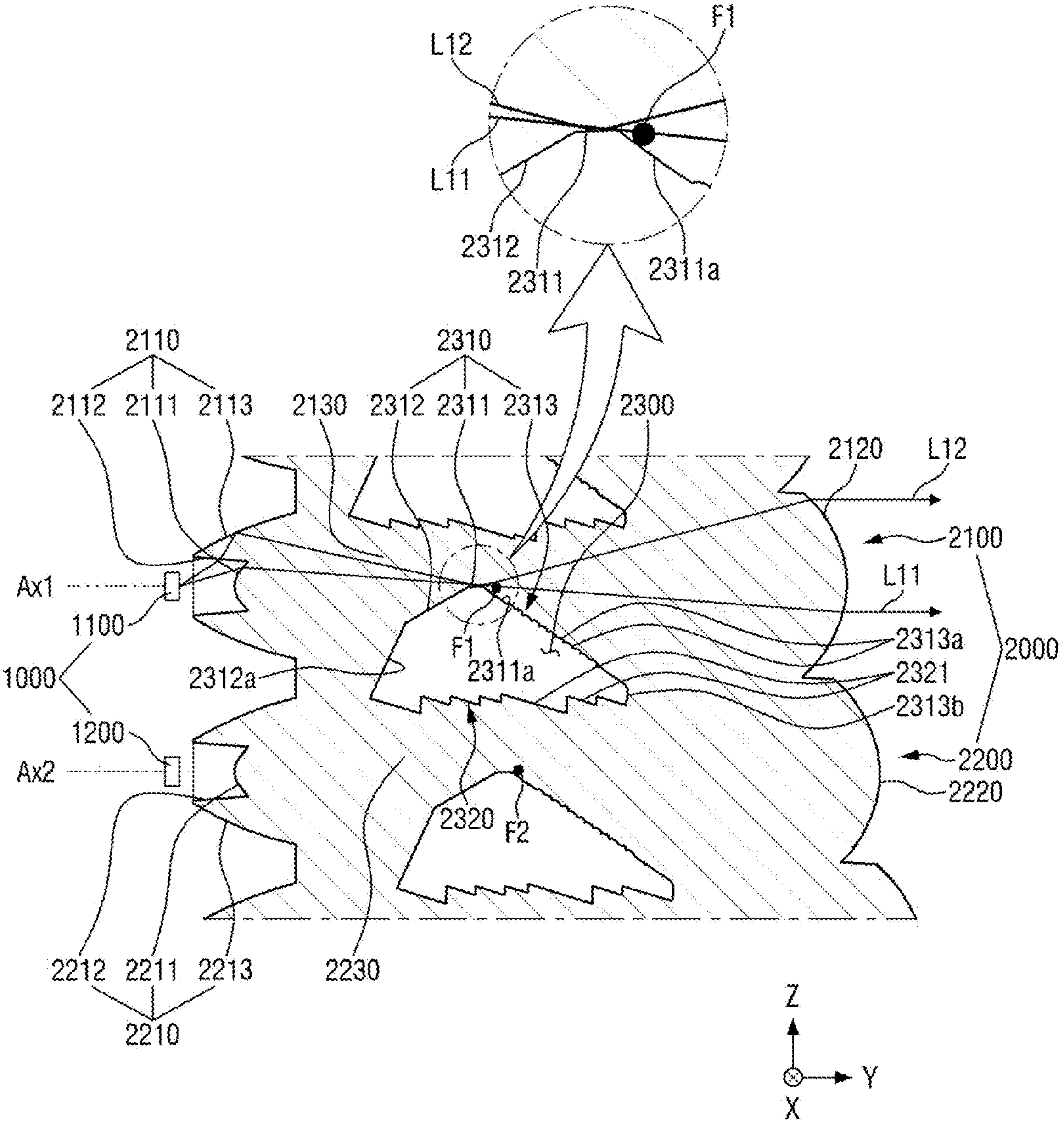
FIG. 16 is a schematic diagram illustrating a path of light reflected by the shield reflection portion according to an embodiment of the present disclosure.

Here, since the light focused on the rear focus F1 of the first exit portion 2120 also has a propagation surface of a size corresponding to that of the emission surface of the first light source 1100, an area of the propagation surface which is disposed behind the rear focus F1 of the first exit portion 2120 may be blocked by the front end of the shield reflection portion 2311. Therefore, as illustrated in FIG. 16, among light L11 and L12 that are incident on the first incident portion 2110 and traveling to be focused on the first exit portion 2120, the light L12 that reaches a certain region behind the shield reflection portion 2311 may be reflected upward to travel to the first exit portion 2120, thereby improving the light efficiency.

In other words, when a center of the propagation surface through which the light emitted from the first light source 1100 is propagated is disposed at the rear focus F1 of the first exit portion 2120, a region of the propagation surface which is disposed in front of the rear focus F1 may travel to the first exit portion 2120 without being blocked. On the other hand, a region of the propagation surface which is disposed behind the rear focus F1 may be blocked, causing light loss. Therefore, the region of the propagation surface which is disposed behind the rear focus F1 may be configured to be reflected by the shield reflection portion 2311 to travel to the first exit portion 2120, thereby improving the light efficiency of the beam pattern formed by the vehicle lamp 1 of the present disclosure.

The light extraction portion 2312 may be disposed behind the shield reflection portion 2311 to extract unnecessary light from the light incident on the first incident portion 2110 so that the unnecessary light can travel along a set path. In the embodiment of the present disclosure, the unnecessary light among the light incident on the first incident portion 2110 may be understood as the light that would cause glare or the like if irradiated to a position outside the beam pattern suitable for the use of the vehicle lamp 1 of the present disclosure.

Figure 17:
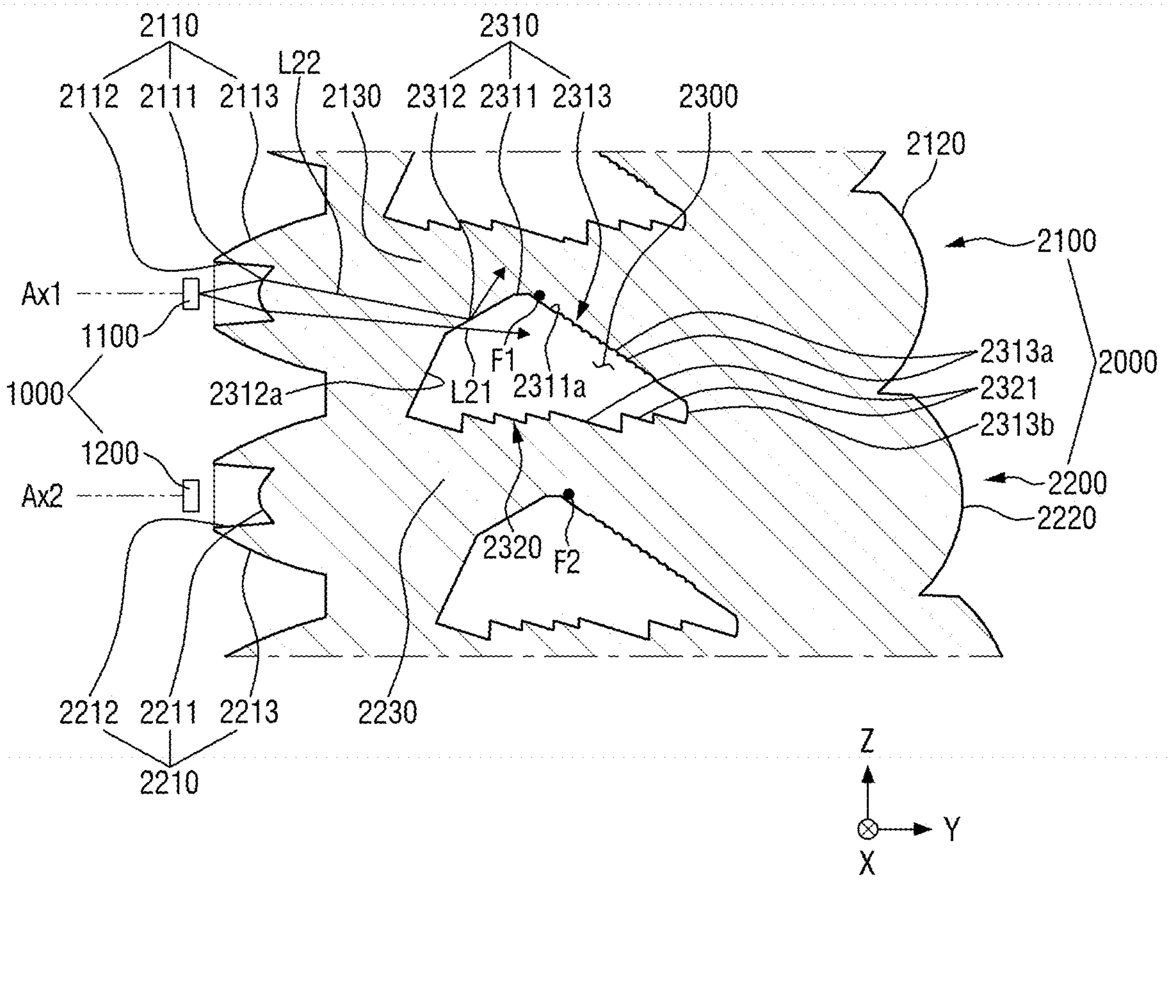
FIG. 17 is a schematic diagram illustrating a path of light by a light extraction portion according to an embodiment of the present disclosure.

The light extraction portion 2312 may extract the unnecessary light from the light incident on the first incident portion 2110 before the unnecessary light is output through the first exit portion 2120. In the embodiment of the present disclosure, a case where the light extraction portion 2312 transmits light L21 or L22, which causes glare or the like, among the light incident on the first incident portion 2110 or reflects the light L21 or L22 so that the light L21 or L22 travels obliquely upward in the forward direction as illustrated in FIG. 17 will be described as an example. However, the present disclosure is not limited thereto, and the light extraction portion 2312 may also control the light, which causes glare or the like, to travel along a set path based on at least one of transmission or reflection.

Figure 18:
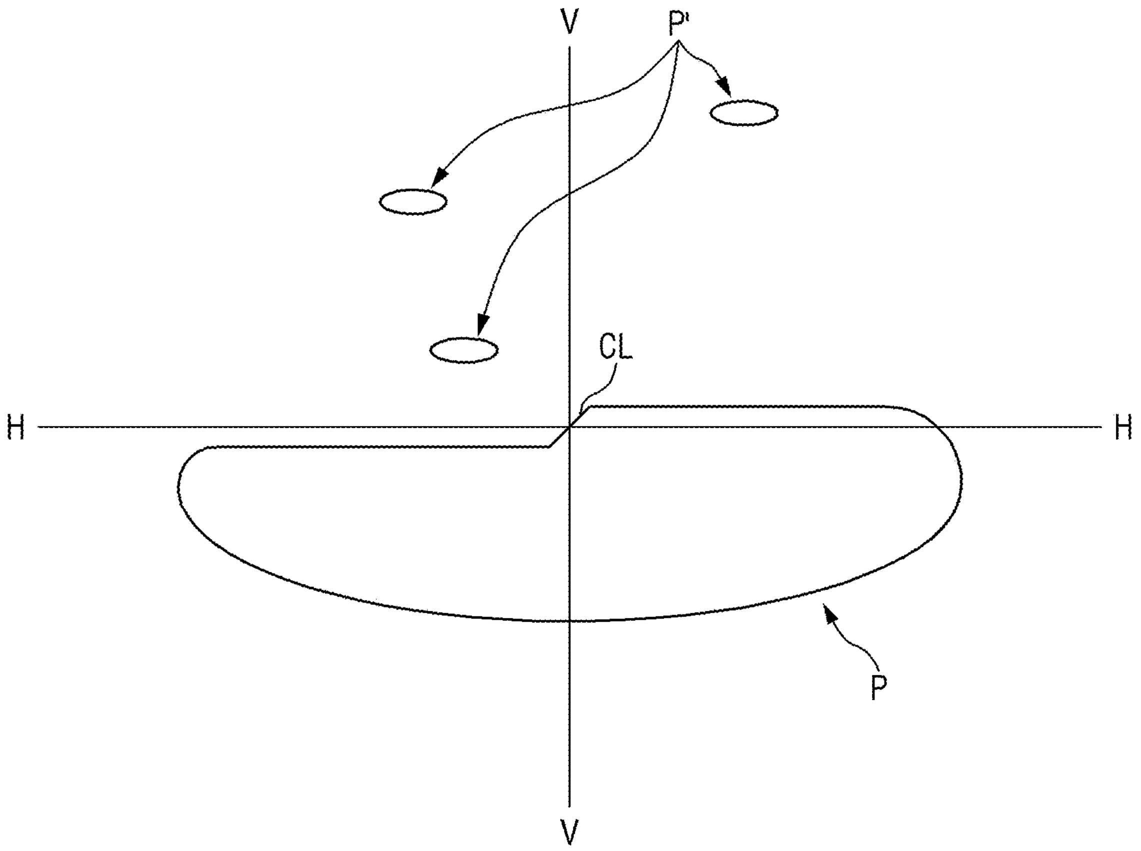
FIG. 18 is a schematic diagram illustrating spots formed by stray light irradiated to positions outside a beam pattern formed by the vehicle lamp according to the embodiment of the present disclosure.

For example, unnecessary light among the light incident on the first incident portion 2110 may be irradiated not only to the low beam pattern P suitable for the use of the vehicle lamp 1 of the present disclosure, but also to unnecessary areas P' as illustrated in FIG. 18, which may cause glare to the driver of a vehicle ahead or may reduce the driver's forward view. Therefore, the light extracted by the light extraction portion 2312 may be controlled to travel along a set path so that it can be prevented from being irradiated to the unnecessary areas P'.

In the embodiment of the present disclosure, a case where the light extraction portion 2312 slopes downward in the backward direction from a front (e.g., distal) end connected to a rear (e.g., proximal) end of the shield reflection portion 2311 to a rear (e.g., proximal) end thereof will be described as an example. However, the present disclosure is not limited thereto, and a formation angle or formation size of the light extraction portion 2312 may be varied depending on the path of light to be extracted by the light extraction portion 2312.

Meanwhile, a case where the rear end of the light extraction portion 2312 is connected to a rear end of the connection portion 2320 by a connection surface 2312*a* and where the light extraction portion 2312 and the connection surface 2312*a* have different angles is described as an example. Such a configuration arises from a notion that if the light extraction portion 2312 extends with a constant angle, it may cause a structural interference with the first incident portion 2110, making it difficult to integrally form the light guiding lenses 2000.

The diffusion portion 2313 may be formed to slope downward in the forward direction from the front end of the extension portion 2311*a*. The diffusion portion 2313 may be spaced apart from the front end of the shield reflection portion 2311 due to the extension portion 2311*a* formed at the front end of the shield reflection portion 2311 as described above. In case no step is formed in the shield reflection portion 2311, the diffusion portion 2313 may be connected to the front end of the shield reflection portion 2311.

Figure 19:
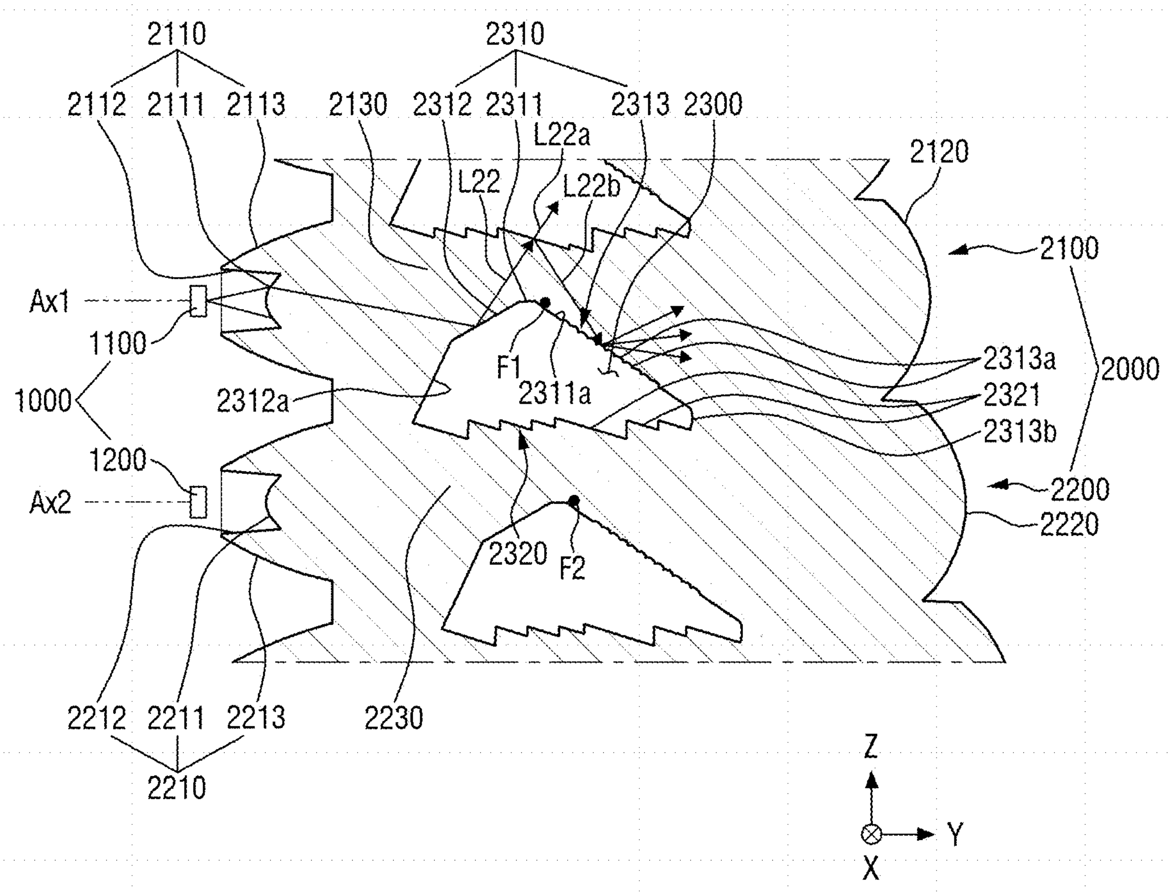
FIG. 19 is a schematic diagram illustrating light diffused by a diffusion portion according to an embodiment of the present disclosure.

The diffusion portion 2313 may include at least one diffusion pattern 2313*a* that diffuses light, which, as illustrated in FIG. 19, is reflected by the connection portion of the adjacent upper shield hole, without transmitting therethrough, among light L22 reflected by the light extraction portion 2312.

In other words, among the light L22 reflected by the light extraction portion 2312 to travel upward in the forward direction, a portion of light L22*a* may pass through the connection portion of the shield hole formed between the first light guiding lens 2100 and the adjacent light guiding lens above the first light guiding lens 2100, and some other portion of light L22*b* may be reflected by the connection portion, without transmitting therethrough. In this case, the light L22*b* reflected by the connection portion may be diffused by the diffusion portion 2313, whereby glare or the like may be prevented or minimized.

Here, a front end of the diffusion portion 2313 and the front end of the connection portion 2320 may be connected by a curved surface 2313*b* having a predetermined curvature. The curved surface 2313*b* may diffuse light whose energy has not been sufficiently reduced by a shield member 4110, which will be described later, to prevent the light from traveling forward and causing glare among the light that passes through the connection portion 2320 after being reflected by a light extraction portion of a shield hole formed between the second light guiding lens 2200 and an adjacent light guiding lens disposed below the second light guiding lens 2200. This configuration will be described in detail later.

The connection portion 2320 may form a part of an upper bound of the second light guiding lens 2200 and may include a plurality of prism patterns 2321 formed to guide the path of unnecessary light among the light that is incident on the second incident portion 2210. At least one of the prism patterns 2321 may be formed to have a different size from at least one other. More specifically, at least one of the prism patterns 2321 may be formed to have a different size from at least one other to ensure that a prism pattern formed at a position with a relatively large amount of incident light has a larger size, so that the light that passes through the prism pattern can be controlled and directed to travel along an appropriate path.

In other words, if a plurality of prism patterns having relatively small sizes are formed at positions, through which a relatively large amount of light passes, in the connection portion 2320, it may be more difficult to control the path of light that passes through each of the prism patterns. Therefore, the sizes of the prism patterns may be increased to facilitate easier control of the path of light. Depending on the amount of light that passes through the connection portion 2320, the sizes of the prism patterns 2321 may be the same or different from one another.

Figure 20:
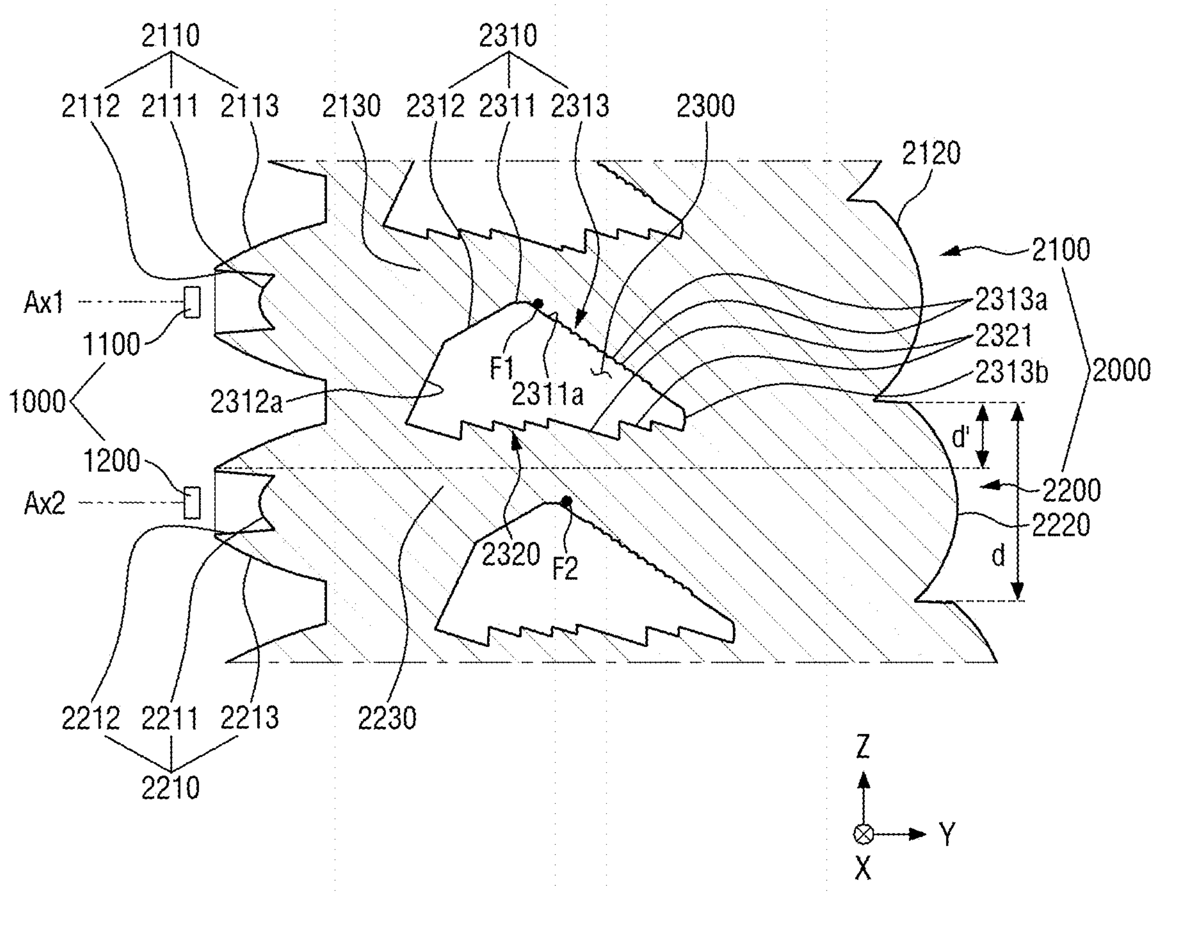
FIG. 20 is a schematic diagram illustrating an area where a connection portion according to an embodiment of the present disclosure is formed.

As illustrated in FIG. 20, assuming that a gap d between the upper bound and a lower bound of the second light guiding lens 2200 is 100%, the prism patterns 2321 may be formed within a region having a gap d' of about 25% in a direction from the upper bound to the lower bound. If the prism patterns 2321 are formed at a position below the top 25% portion of the gap d, the light incident on the second incident portion 2210 and traveling to the second exit portion 2220 is likely to be interfered with. On the other hand, if the prism patterns 2321 are disposed above the upper surface of the second light guiding lens 2200, that is, disposed above a lower surface of the first light guiding lens 2100, the path of unnecessary light may become excessively long before it reaches the connecting portion 2320. Accordingly, it may be more difficult to control the path of light, which may cause glare.

Each of the optical lenses 3000 may transmit light that is output from a corresponding light guiding lens among the plurality of light guiding lenses 2000 to form a beam pattern suitable for the use of the vehicle lamp 1 of the present disclosure.

Figure 21:
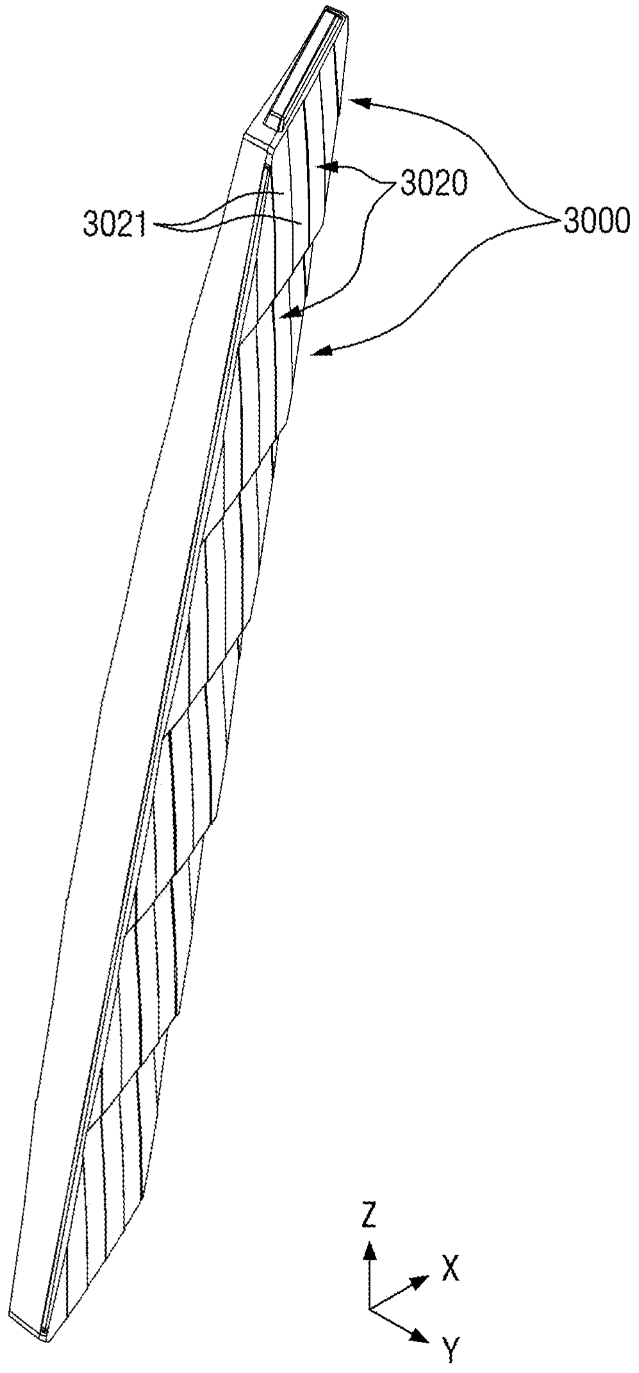
FIGS. 21 and 22 are perspective views of a plurality of optical lenses according to an embodiment of the present disclosure.
Figure 22:
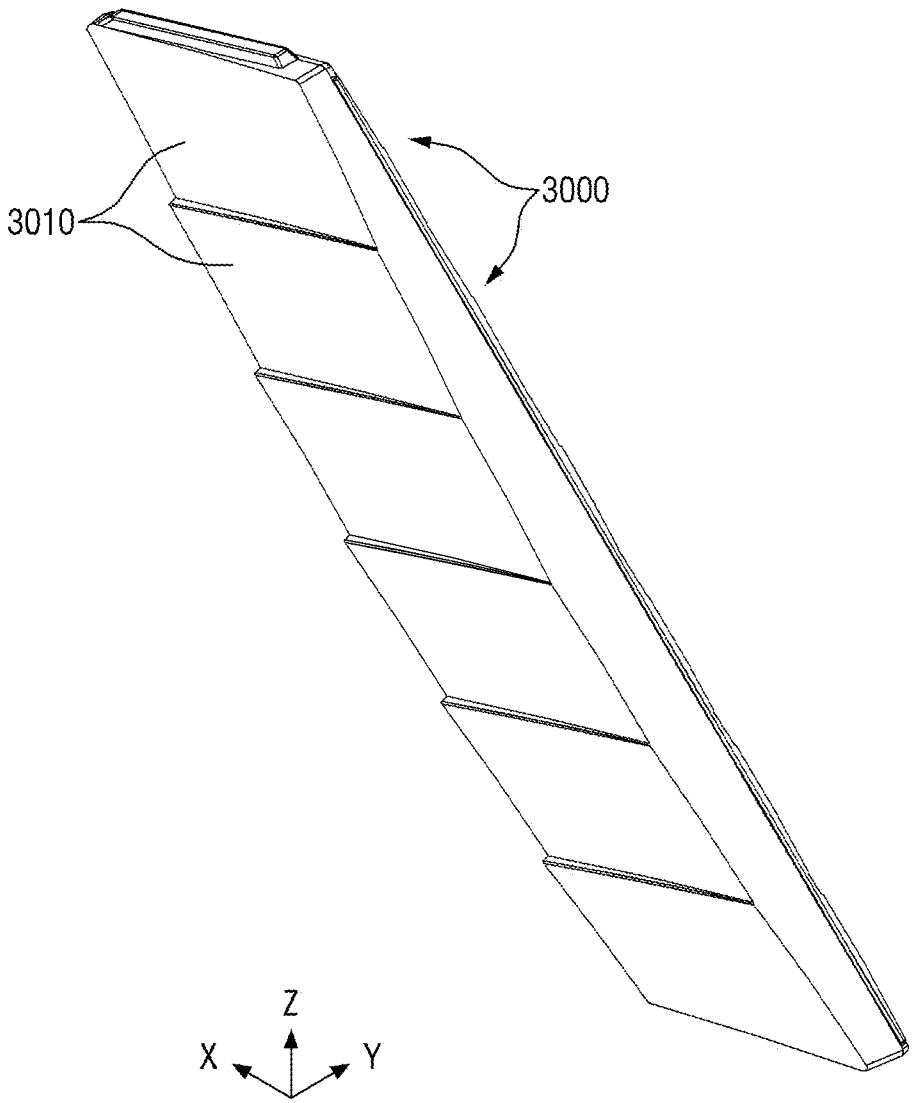

FIGS. 21 and 22 are perspective views of a plurality of optical lenses 3000 according to an embodiment of the present disclosure. Referring to FIGS. 21 and 22, like the light guiding lenses 2000, the optical lenses 3000 may be integrally formed in the up-down direction and may be inclined so that they are disposed more to one side along the left-right direction going from top to bottom.

In the embodiment of the present disclosure, a case where each of the optical lenses 3000 is formed such that one side is disposed more forward than the other side in the left-right direction will be described as an example. This configuration is to form the optical lenses 300 along the body line of the vehicle, like the light sources 1000 and the light guiding lenses 2000.

Each of the optical lenses 3000 may allow light incident on an incident surface 3010 to be output through an exit surface 3020. Each of the optical lenses 3000 may be formed such that the incident surface 3010 is shaped as a curved surface that is concave forward. This configuration is to ensure that the exit portion 2020 of a light guiding lens and the incident surface 3010 of an optical lens corresponding to each other among the light guiding lenses 2000 and the optical lenses 3000 share a common focus. This will be described in detail later.

In the embodiment of the present disclosure, a case where the exit surface 3020 is composed of a plurality of facets 3021 to more easily control the path of light that passes through each of the optical lenses 3000 will be described as an example. However, this is merely an example used to help understand the present disclosure, and the present disclosure is not limited thereto. In each of the optical lenses 3000, at least one of the incident surface 3010 or the exit surface 3020 may be composed of a plurality of facets.

In the embodiment of the present disclosure, a case where incident surfaces of adjacent optical lenses among the optical lenses 3000 are formed to have a step between them is described as an example. However, the present disclosure is not limited thereto, and the incident surfaces of the adjacent optical lenses among the optical lenses 3000 may also be formed to be continuous without a step.

Here, the exit portion 2020 of a light guiding lens and the incident surface 3010 of an optical lens corresponding to each other among the light guiding lenses 2000 and the optical lenses 3000 may be formed to have a common focus. If the exit portion 2020 of the light guiding lens and the incident surface 3010 of the optical lens corresponding to each other among the light guiding lenses 2000 and the optical lenses 3000 have separate individual focuses, light output from each of the light guiding lenses 2000 may be incident not only on a corresponding optical lens among the optical lenses 3000 but also on other adjacent optical lenses, thus causing glare or the like.

Figure 23:
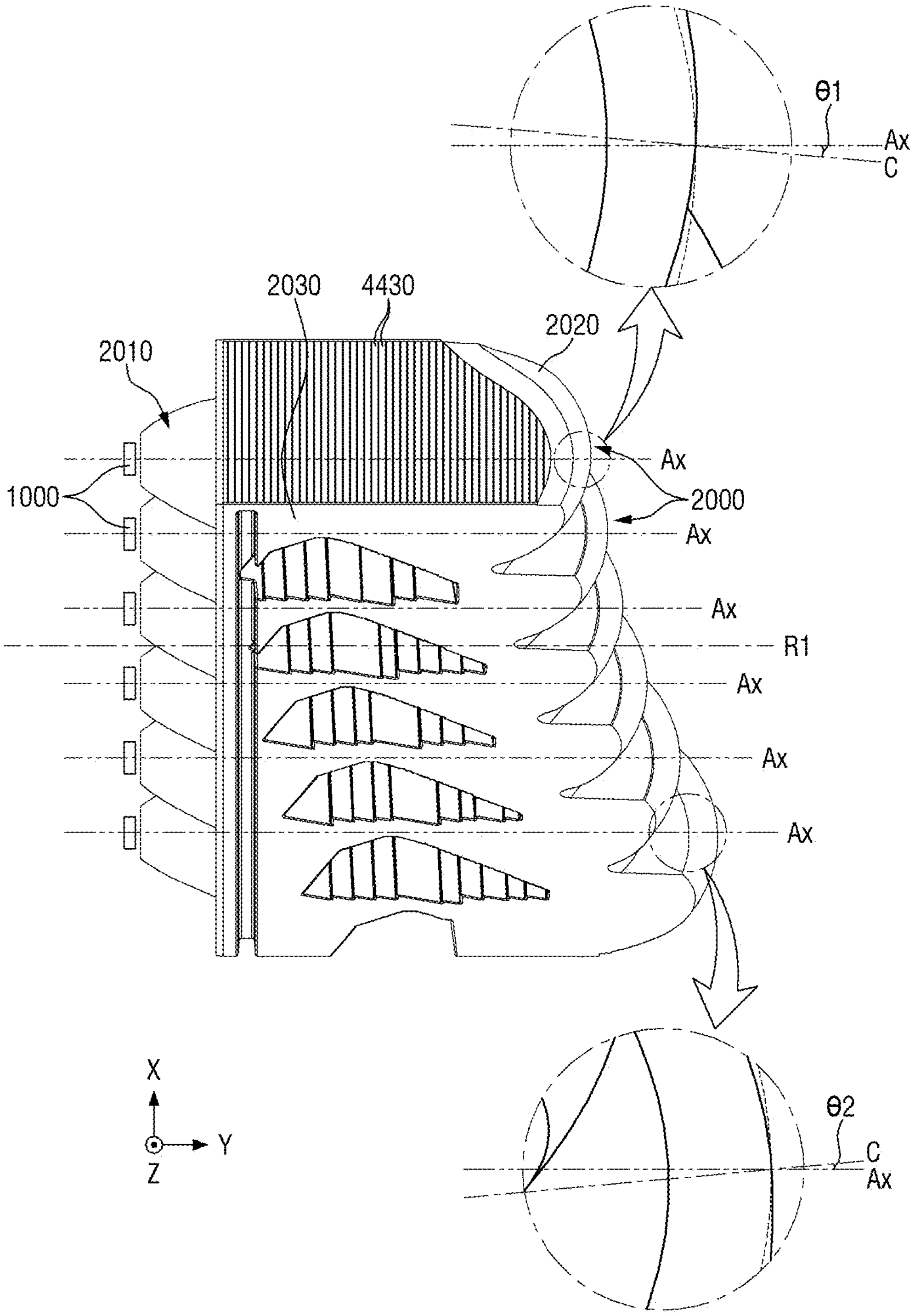
FIG. 23 is a schematic diagram illustrating a center line of an exit portion of each of the light guiding lenses according to the embodiment of the present disclosure.

As illustrated in FIG. 23, a center line C of the exit portion 2020 of at least one of the light guiding lenses 2000 may be tilted in a predetermined direction with respect to a horizontal reference line R1 which is parallel to the front-back direction and passes through a center of the light guiding lenses 2000 in the left-right direction, so that the exit portion 2020 of a light guiding lens and the incident surface 3010 of an optical lens corresponding to each other among the light guiding lenses 2000 and the optical lenses 3000 have a common focus as described above.

In other words, the center line C of the exit portion 2020 of each of the light guiding lenses 2000 disposed on both sides of the horizontal reference line R1 that passes through the center of the light guiding lenses 2000 in the left-right direction may be tilted at a predetermined angle in a direction toward the horizontal reference line R1. The center line C of the exit portion 2020 of each of the light guiding lenses 2000 may be understood as an axial line around which the exit portion 2020 is axisymmetric.

For example, among the light guiding lenses 2000, the exit portion 2020 of a light guiding lens corresponding to a light source whose optical axis Ax is disposed to the left of the horizontal reference line R1 may have the center line C tilted to the right by a predetermined angle $\theta 1$ toward the horizontal reference line R1. Conversely, among the light guiding lenses 2000, the exit portion 2020 of a light guiding lens corresponding to a light source whose optical axis Ax is disposed to the right of the horizontal reference line R1 may have the center line C tilted to the left by a predetermined angle $\theta 2$ toward the horizontal reference line R1.

Here, the light guiding lenses 2000 may be tilted by different angles depending on their distances from the horizontal reference line R1 in the left-right direction. For example, the light guiding lenses 2000 may be tilted by a greater angle as the distance from the horizontal reference line R1 in the left-right direction increases.

Figure 24:
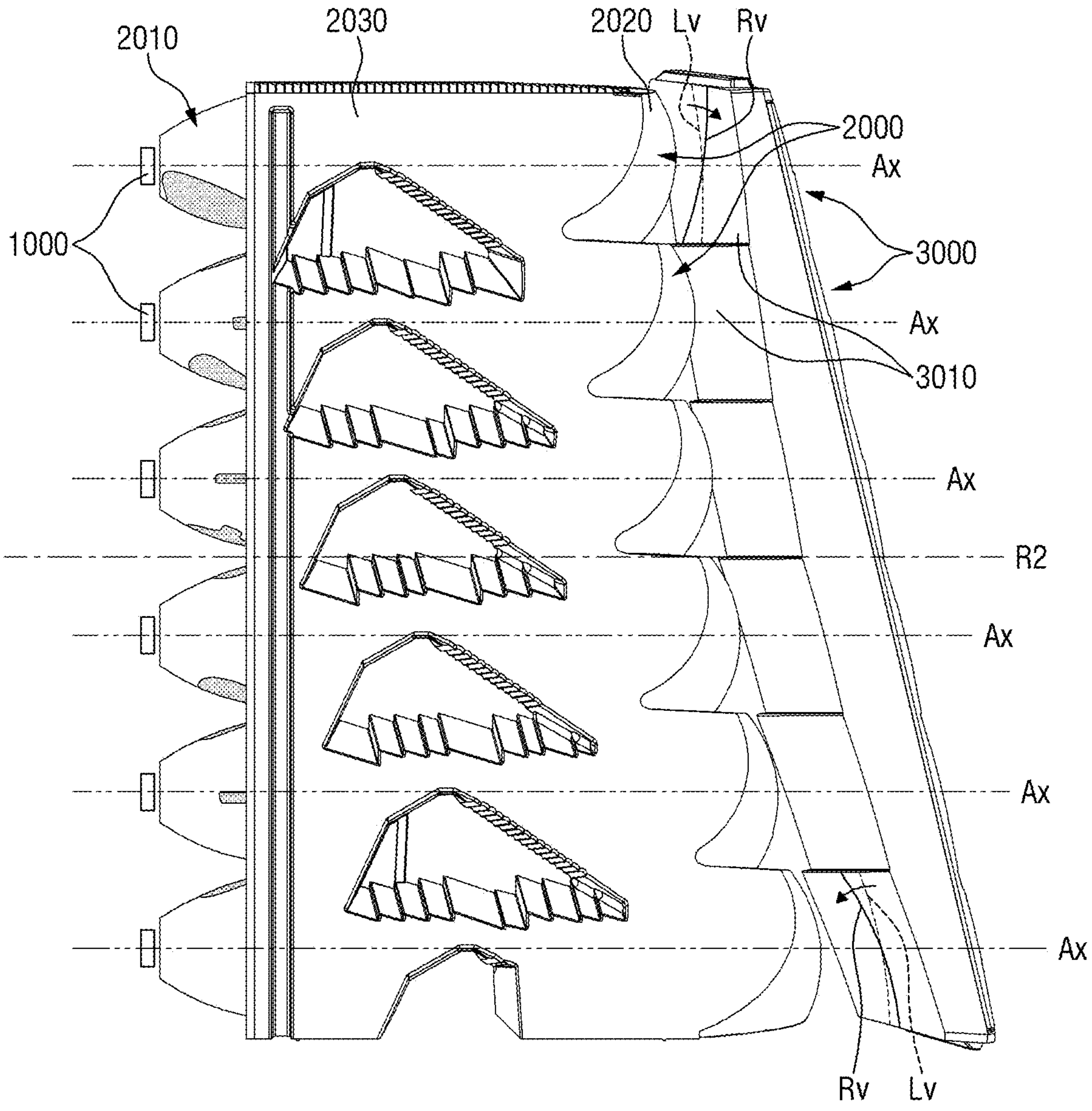
FIG. 24 is a schematic diagram illustrating a tilting direction of an up-down curvature formed on an incident surface of each of the optical lenses according to the embodiment of the present disclosure.

In addition, as illustrated in FIG. 24, the incident surface 3010 of each of the optical lenses 3000 disposed above and below a vertical reference line R2 which is parallel to the front-back direction and passes through a center of the light guiding lenses 2000 in the up-down direction may have an up-down curvature tilted to either side of a vertical line that perpendicularly passes through an optical axis Ax of a light source corresponding to each of the light guiding lenses 2000 among the light sources 1000, so that the exit portion 2020 of a light guiding lens and the incident surface 3010 of an optical lens corresponding to each other among the light guiding lenses 2000 and the optical lenses 3000 share a common focus as described above.

In other words, among the optical lenses 3000, the incident surface 3010 of an optical lens disposed above the vertical reference line R2 may be formed such that an up-down curvature Rv is tilted to the right of a vertical line Lv. Conversely, the incident surface 3010 of an optical lens disposed below the vertical reference line R2 may be formed such that the up-down curvature Rv is tilted to the left of the vertical line Lv.

Here, the up-down curvature Rv of the incident surface 3010 of an optical lens disposed above the vertical reference line R2 may be tilted to the right of the vertical line Lv, and the up-down curvature Rv of the incident surface 3010 of an optical lens disposed below the vertical reference line R2 may be tilted to the left of the vertical line Lv since the optical axis Ax of a light source corresponding to the optical lens above the vertical reference line R2 is disposed to the left of the horizontal reference line R1, and the optical axis Ax of a light source corresponding to the optical lens below the vertical reference line R2 is disposed to the right of the horizontal reference line R1 as illustrated in FIG. 23 described above.

In summary, the center line C of the exit portion 2020 of each of the light guiding lenses 2000 may be tilted to the left or right of the horizontal reference line R1, and the up-down curvature Rv of the incident surface 3010 of each of the optical lenses 3000 may be tilted to the left or right of the vertical line Lv as described above in order to form a common focus for the combination of the exit portion 2020 of each of the light guiding lenses 2000 and the incident surface 3010 of an optical lens corresponding to each of the light guiding lenses 2000 among the optical lenses 3000. Therefore, even if the light that is output from each of the light guiding lenses 2000 is incident not only on a corresponding optical lens among the optical lenses 3000 but also on other adjacent optical lenses, the light can travel parallel to both the horizontal and vertical directions, thereby preventing glare.

The vehicle lamp 1 of the present disclosure may further include the mounting bracket 4000 that includes a shield member 4110 inserted into the shield hole 2300 formed between the first light guiding lens 2100 and the second light guiding lens 2200 described above.

The mounting bracket 4000 may include a first bracket 4100 having the shield member 4110 and a second bracket 4200 assembled to the first bracket 4100. While the first bracket 4100 is positioned such that the shield member 4110 is inserted into the shield hole 2300 from one side of the light guiding lenses 2000, the second bracket 4200 may be assembled to the first bracket 4100 from the other side of the light guiding lenses 2000. Accordingly, positions of the first bracket 4100 and the second bracket 4200 may be fixed with the light guiding lenses 2000 interposed therebetween.

In the embodiment of the present disclosure, a case where at least one assembly protrusion 4100*a* is formed on the first bracket 4100 and at least one assembly groove 4200*a* is formed in the second bracket 4200 such that they are assembled to each other will be described as an example. However, the present disclosure is not limited thereto, and the first bracket 4100 and the second bracket 4200 may also be assembled by various methods such as screw coupling, hook coupling, adhesive, and the like.

In the mounting bracket 4000, an opening 4300 corresponding to the optical lenses 3000 may be formed when the first bracket 4100 and the second bracket 4200 are assembled. Therefore, the light emitted from the light sources 1000 may be prevented from leaking while it passes through the optical lenses 3000 via the light guiding lenses 2000.

In the embodiment of the present disclosure, a case where a frame 4310 that forms the opening 4300 is integrally formed with the second bracket 4200 will be described as an example. However, the present disclosure is not limited thereto. The frame 4310 for forming the opening 4300 may also be formed in the first bracket 4100, or frames for forming different parts of the opening 4300 may also be formed in the first bracket 4100 and the second bracket 4200, respectively.

Figure 25:
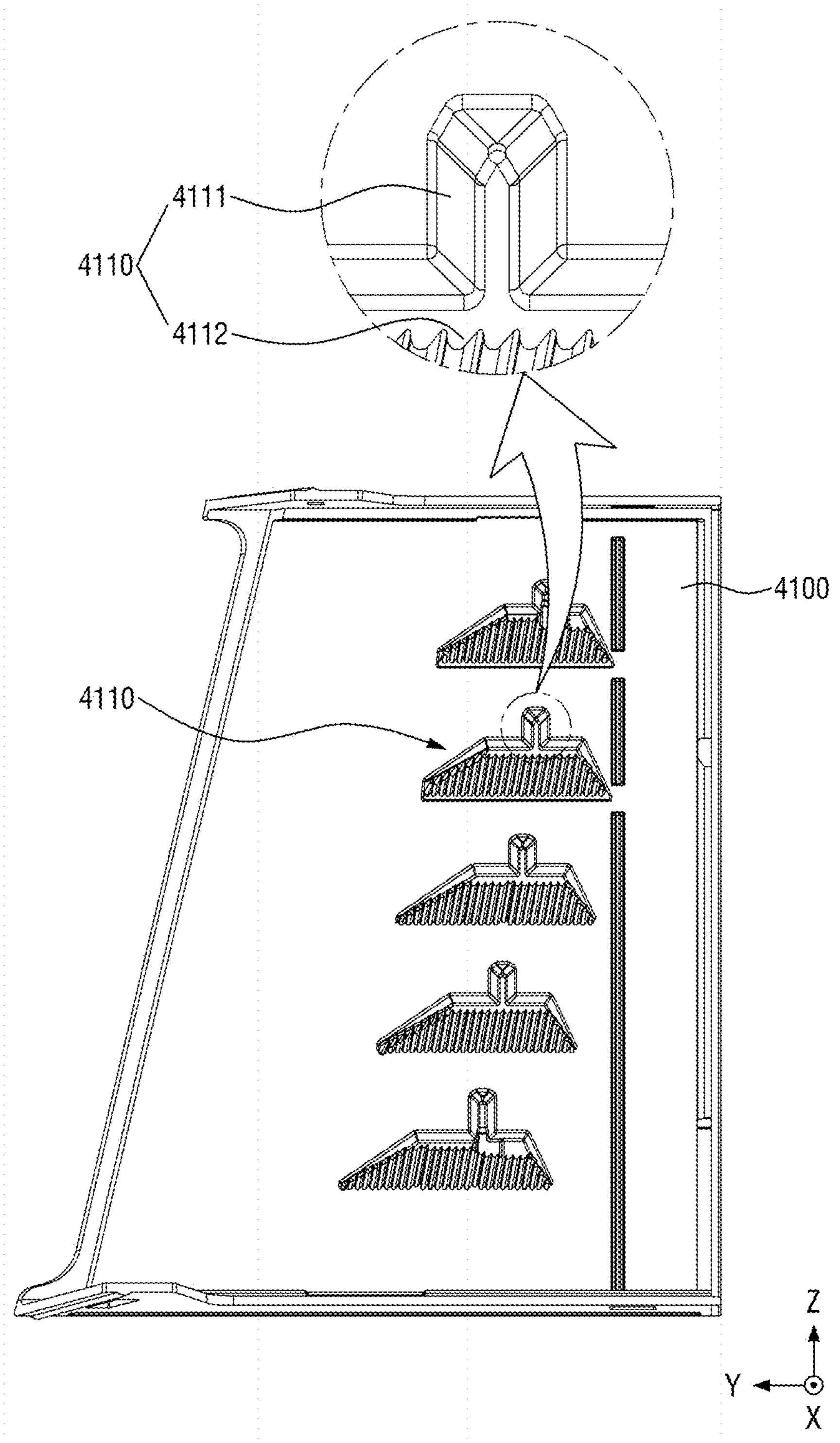
FIG. 25 is a side view of a first bracket having shield members according to an embodiment of the present disclosure.
Figure 26:
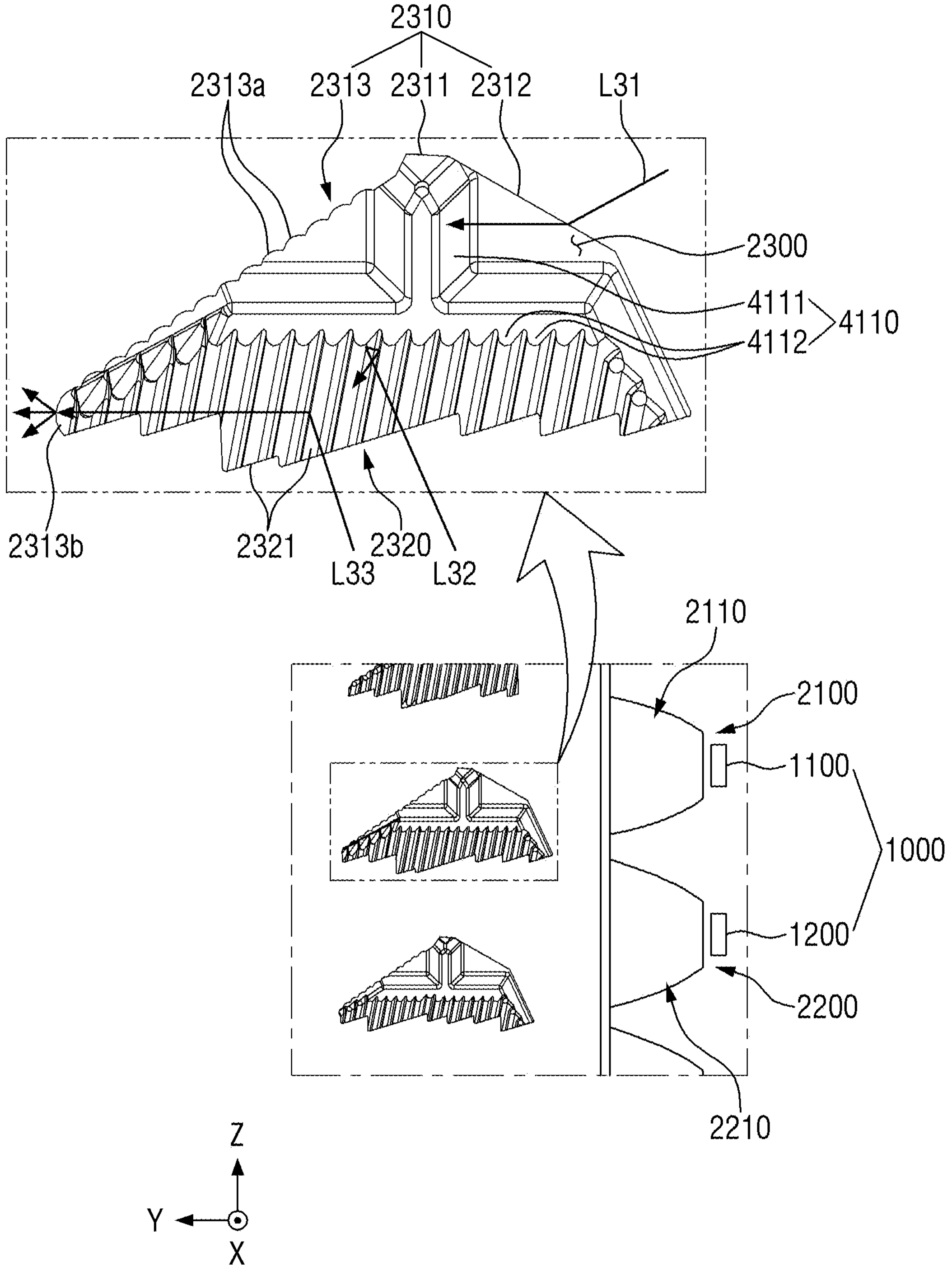
FIG. 26 is a schematic diagram illustrating light blocked by a shield member according to an embodiment of the present disclosure.

FIG. 25 is a side view of the first bracket 4100 having shield members 4110 according to an embodiment of the present disclosure. FIG. 26 is a schematic diagram illustrating light blocked by a shield member 4110 according to an embodiment of the present disclosure. FIGS. 25 and 26 depict an example of a case where the vehicle lamp 1 is viewed in a direction from the second bracket 4200 toward the first bracket 4100.

Referring to FIGS. 25 and 26, each shield member 4110 may be inserted into a shield hole 2300 when the first bracket 4100 and the second bracket 4200 are assembled and may block light extracted by the light extraction portion 2312 of the shield hole 2300. In the embodiment of the present disclosure, a shield member 4110 inserted into the shield hole 2300 formed between the first light guiding lens 2100 and the second light guiding lens 2200 will be described below as an example.

The shield member 4110 may block unnecessary light among the light incident on the second light guiding lens 2200 as well as the light incident on the first light guiding lens 2100. In other words, the shield member 4110 may block light L31 that passes through the light extraction portion 2312 among the light incident on the first light guiding lens 2100 while diffusing at least a portion of light L32 and L33 reflected obliquely upward in the forward direction to pass through the connection portion 2320 by a light extraction portion of a shield hole formed between the second light guiding lens 2200 and an adjacent light guiding lens below the second light guiding lens 2200.

Here, a blocking wall 4111 may be formed in an upper part of the shield member 4110 to prevent the light L31 that passes through the light extraction portion 2312 from reaching the first exit portion 2120 through an air gap within the shield hole 2300.

In the embodiment of the present disclosure, a case where the blocking wall 4111 is formed in the upper part of the shield member 4110 such that the shield member 4110 has roughly an inverted-T shape will be described as an example. This is to reduce a required material and reduce the overall weight compared with a case where the shield member 4110 is formed to have roughly a triangular shape, like the shield hole 2300.

In addition, the shield member 4110 may have a plurality of diffusion patterns 4112 formed on a lower surface to prevent glare or the like by diffusing at least a portion of the light L32 and L33 that passes through the connection portion 2320.

Here, if light L33 is present, which travels forward without being sufficiently diffused by the diffusion patterns 4112 among the light L32 and L33 that passes through the connection portion 2320, glare may occur. Therefore, the front end of the diffusion portion 2313 and the front end of the connection portion 2320 may be connected by the curved surface 2313*b* having a predetermined curvature to diffuse light whose energy has not been sufficiently reduced by the diffusion patterns 4112. Accordingly, glare can be prevented.

In FIGS. 25 and 26 described above, a case where unnecessary light among the light incident on the second light guiding lens 2200 is reflected by the light extraction portion of the shield hole formed between the second light guiding lens 2200 and the adjacent light guiding lens below the second light guiding lens 2200 to pass through the connection portion 2320 is described as an example. However, the present disclosure is not limited thereto, and a portion of the unnecessary light among the light incident on the second light guiding lens 2200 may also be reflected without being transmitted through the connection portion 2320. In this case, as in FIG. 19 described above, the light reflected by the connection portion 2320 may be diffused by the diffusion portion 2313, thereby preventing glare.

Figure 27:
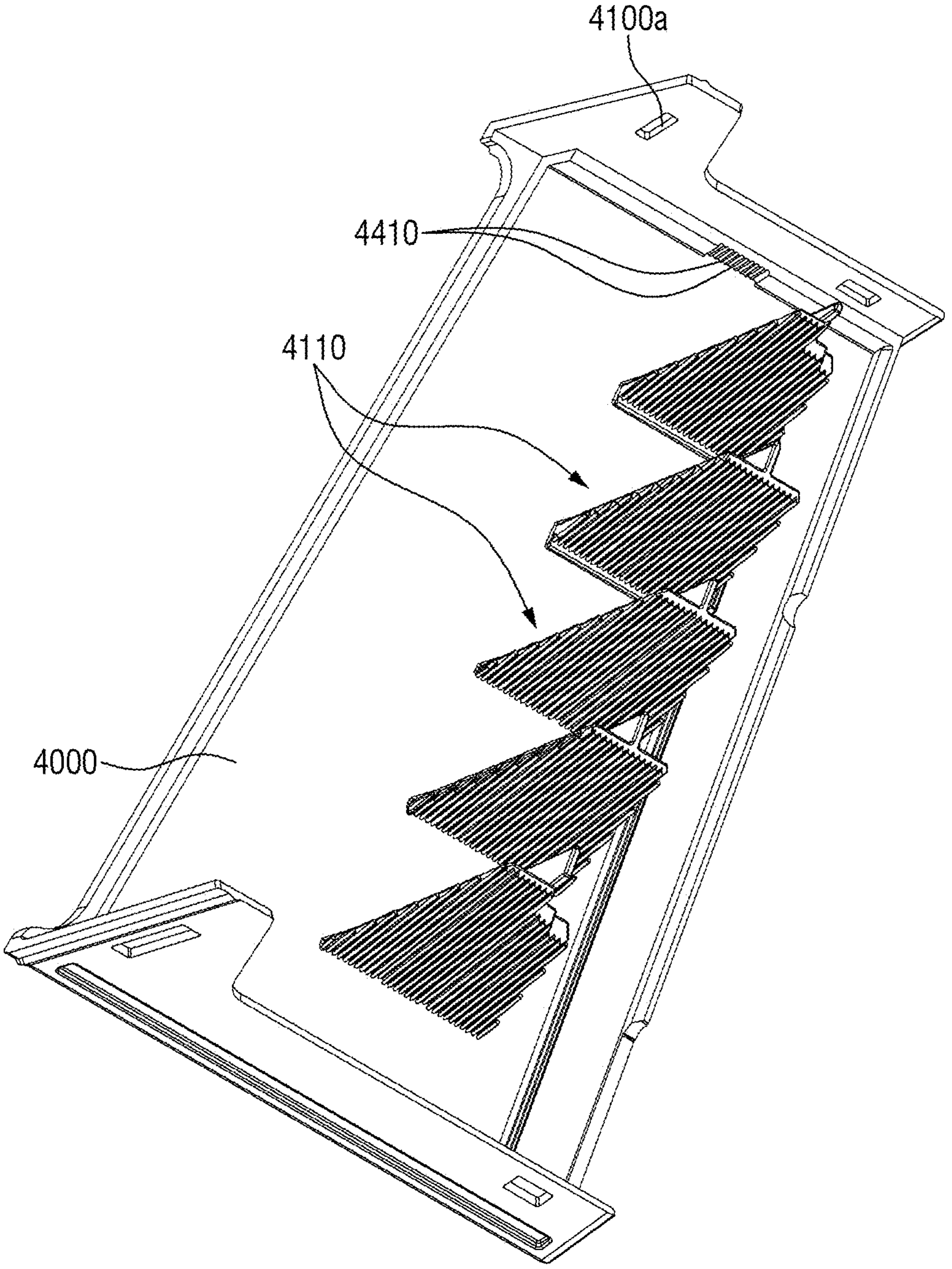
FIG. 27 is a perspective view illustrating diffusion patterns formed on a first bracket according to an embodiment of the present disclosure.
Figure 28:
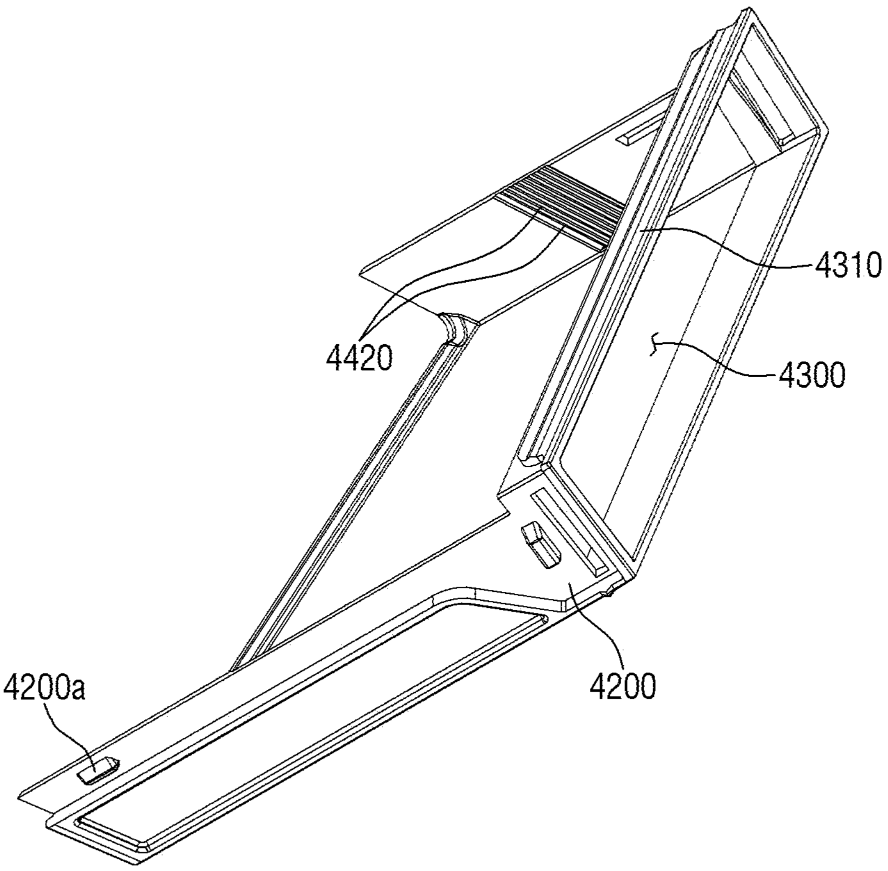
FIG. 28 is a perspective view illustrating diffusion patterns formed on a second bracket according to an embodiment of the present disclosure.

In the embodiment described above, a case where unnecessary light is blocked by the shield member 4110 inserted into the shield hole 2300 formed between the first light guiding lens 2100 and the second light guiding lens 2200 disposed adjacent to each other in the up-down direction is described as an example. However, an uppermost light guiding lens among the light guiding lenses 2000 may include no shield hole formed on an upper side thereof. Therefore, as illustrated in FIGS. 27 and 28, diffusion patterns 4410 or 4420 for diffusing light may be formed on at least a portion of a surface of each of the first bracket 4100 and the second bracket 4200 which faces a top surface of the uppermost light guiding lens among the light guiding lenses 2000. In addition, as illustrated in FIG. 23 described above, diffusion patterns 4430 for diffusing light may be formed on the top surface of the uppermost light guiding lens among the light guiding lenses 2000.

As described above, even when the vehicle lamp 1 of the present disclosure has the light guiding lenses 2000 formed integrally with each other, unnecessary light among the light incident on each of the light guiding lenses 2000 can be prevented from being emitted outside the vehicle lamp 1. Therefore, a slimmer exterior design form factor may be implemented while being capable of forming an optimal beam pattern by preventing light from being irradiated to unnecessary regions and causing glare and/or reducing visibility.

In concluding the detailed description, those skilled in the art will appreciate that many variations and modifications can be made to the exemplary embodiments without substantially departing from the principles of the present disclosure. Therefore, the disclosed exemplary embodiments are to be used in a generic and descriptive sense only and not for purposes of limitation.

A vehicle lamp of the present disclosure described above provides at least one of the following advantages.

When light emitted from a plurality of light sources is output through a plurality of light guiding lenses formed integrally, a cutoff line of a beam pattern can be formed via a shield hole formed between adjacent light guiding lenses and a shield member inserted into the shield hole. In addition, the light can be prevented from being irradiated to unnecessary spots.

Furthermore, since a common focus can be formed according to a tilting direction of a center line of an exit portion of each of the light guiding lenses and a tilting direction of an up-down curvature of an incident surface of each of the optical lenses, even when the light output from each of the light guiding lenses is incident not only on a corresponding optical lens but also on other adjacent optical lenses, the light can be prevented from being irradiated to unnecessary spots.

However, the effects of the present disclosure are not restricted to those set forth herein. The above and other effects of the present disclosure will become more apparent to one of ordinary skill in the art to which the present disclosure pertains.

What is claimed is:

1. A vehicle lamp comprising:

a plurality of light sources arranged along an up-down direction to generate light; and a plurality of light guiding lenses disposed in front of the plurality of light sources and integrally formed along an arrangement direction of the plurality of light sources, wherein each of the plurality of light guiding lenses comprises:

an incident portion onto which light emitted from a corresponding light source among the plurality of light sources is incident;

an exit portion disposed in front of the incident portion to output the incident light; and a transmission portion that transmits at least a portion of the light incident on the incident portion to the exit portion, wherein the exit portion is formed to be convex forward, and wherein a center line of the exit portion of at least one of the plurality of light guiding lenses is tilted with respect to a first reference line by a predetermined angle, the first reference line being parallel to a front-back direction and passing through a lateral central point of the plurality of light guiding lenses.

2. The vehicle lamp of claim 1, wherein, for the plurality of light sources, optical axes are different from one another in a left-right direction and the up-down direction.

3. The vehicle lamp of claim 1, wherein the plurality of light sources are slanted such that they are disposed more toward a left side or a right side going from top to bottom.

4. The vehicle lamp of claim 1, wherein the incident portion comprises:

a central surface that is centered on an optical axis of a corresponding light source among the plurality of light sources;

a protruding surface formed to protrude from an edge of the central surface toward the corresponding light source; and a reflective surface that reflects light incident on the protruding surface to allow the light to travel toward the exit portion.

5. The vehicle lamp of claim 1, wherein the exit portion of at least one of the plurality of light guiding lenses is formed such that the center line is tilted in a direction toward the first reference line.

6. The vehicle lamp of claim 1, wherein a tilting direction of the center line of the exit portion varies according to a relative position of an optical axis of a corresponding light source with respect to the first reference line.

7. The vehicle lamp of claim 1, wherein among the plurality of light guiding lenses, a light guiding lens that corresponds to a light source whose optical axis is disposed on a first side of the first reference line in the left-right direction and a light guiding lens that corresponds to a light source whose optical axis is disposed on a second side of the first reference line in the left-right direction are formed such that center lines of the exit portions thereof are tilted in opposite directions.

8. The vehicle lamp of claim 1, further comprising a plurality of optical lenses, each allowing light output from a corresponding light guiding lens among the plurality of light guiding lenses to be transmitted therethrough to form a predetermined beam pattern.

9. The vehicle lamp of claim 8, wherein an incident surface of at least one of the plurality of optical lenses is formed such that an up-down curvature thereof is tilted to either side of a vertical line in a left-right direction.

10. The vehicle lamp of claim 9, wherein a tilting direction of the up-down curvature of each of the plurality of optical lenses varies according to a direction in which an optical axis of a corresponding light source among the plurality of light sources is disposed with respect to a second reference line, the second reference line being parallel to the front-back direction and passing through a vertical central point of the plurality of light guiding lenses.

11. The vehicle lamp of claim 10, wherein among the plurality of optical lenses, an optical lens that corresponds to a light source whose optical axis is disposed above the second reference line and an optical lens that corresponds to a light source whose optical axis is disposed below the second reference line are formed such that up-down curvatures thereof are tilted in opposite directions with respect to the vertical line.

12. The vehicle lamp of claim 9, wherein a tilting direction of the up-down curvature of each of the plurality of optical lenses varies according to a direction in which an optical axis of a corresponding light source among the plurality of light sources is disposed with respect to the first reference line.

13. The vehicle lamp of claim 12, wherein each of the plurality of optical lenses is tilted to a side of the vertical line in a direction toward the first reference line.

14. The vehicle lamp of claim 12, wherein the tilting direction of the up-down curvature of each of the plurality of optical lenses varies according to an optical axis of a corresponding light source among the plurality of light sources with respect to a second reference line, the second reference line being parallel to the front-back direction and passing through the vertical central point of the plurality of light guiding lenses.

15. The vehicle lamp of claim 1, wherein the plurality of light guiding lenses comprise a first light guiding lens and a second light guiding lens disposed adjacent to each other in the up-down direction, and a shield hole is formed between the first light guiding lens and the second light guiding lens to block at least a portion of light incident on the first light guiding lens.

16. The vehicle lamp of claim 1, wherein a lowermost light guiding lens among the plurality of light guiding lenses comprises a shield portion formed as a recess on a bottom surface to block at least a portion of light that is incident on the incident portion.

17. A vehicle lamp comprising:

a plurality of light sources arranged along an up-down direction to generate light;

a plurality of light guiding lenses disposed in front of the plurality of light sources and integrally formed along an arrangement direction of the plurality of light sources; and a plurality of optical lenses, each allowing light output from a corresponding light guiding lens among the plurality of light guiding lenses to be transmitted therethrough to form a predetermined beam pattern, wherein each of the plurality of light guiding lenses comprises:

an incident portion onto which light emitted from a corresponding light source among the plurality of light sources is incident;

an exit portion disposed in front of the incident portion to output the incident light; and a transmission portion that transmits at least a portion of the light incident on the incident portion to the exit portion, wherein the exit portion is formed to be convex forward, and wherein an incident surface of at least one of the plurality of optical lenses is tilted sideways to either side of a vertical line.

18. A vehicle lamp comprising:

a plurality of light sources arranged along an up-down direction to generate light; and a plurality of light guiding lenses disposed in front of the plurality of light sources and integrally formed along an arrangement direction of the plurality of light sources, wherein each of the plurality of light guiding lenses comprises:

an incident portion onto which light emitted from a corresponding light source among the plurality of light sources is incident;

an exit portion disposed in front of the incident portion to output the incident light; and a transmission portion that transmits at least a portion of the light incident on the incident portion to the exit portion, wherein the exit portion is formed to be convex forward, and wherein orientation angles of optical axes of the plurality of light sources are different from one another in at least one of a left-right direction or the up-down direction.

* * * * *